US009602355B2

(12) United States Patent
Binetti et al.

(10) Patent No.: US 9,602,355 B2
(45) Date of Patent: Mar. 21, 2017

(54) NETWORK INTERFACE WITH ADJUSTABLE RATE

(71) Applicant: Cisco Technology, Inc., San Jose, CA (US)

(72) Inventors: Stefano Binetti, Monza (IT); Luca Della Chiesa, Concorezzo (IT); Gary Nicholl, Ontario (CA); Walid Wakim, Aurora, IL (US); Theodore Kupfer, Tulpenweg (GE); Mohammed I. Tatar, Kanata (CA); Cedrik K. Begin, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 524 days.

(21) Appl. No.: 13/955,494

(22) Filed: Jul. 31, 2013

(65) Prior Publication Data
US 2015/0036694 A1 Feb. 5, 2015

(51) Int. Cl.
*H04L 12/24* (2006.01)
*H04L 12/46* (2006.01)
*H04L 12/931* (2013.01)

(52) U.S. Cl.
CPC ...... *H04L 41/0896* (2013.01); *H04L 12/4641* (2013.01); *H04L 49/354* (2013.01)

(58) Field of Classification Search
CPC ........ H04L 12/2859; H04L 12/4641–12/4645; H04L 2012/5617; H04L 49/354; H04L 49/358; H04L 49/3045; H04L 41/0896
See application file for complete search history.

(56) References Cited

U.S. PATENT DOCUMENTS

| 6,999,462 | B1 | 2/2006 | Acharya ........................ 370/401 |
| 7,016,996 | B1 * | 3/2006 | Schober ................ G06F 13/362 |
| | | | 710/113 |
| 7,564,869 | B2 | 7/2009 | Cafiero et al. ................ 370/466 |
| 2003/0223416 | A1 | 12/2003 | Rojas et al. .................. 370/389 |

(Continued)

OTHER PUBLICATIONS

Bernstein, Greg, et al., "VCAT/LCAS in a Clamshell," IEEE Communications Magazine, May 2006, pp. 34-36.

(Continued)

*Primary Examiner* — Eric Myers
(74) *Attorney, Agent, or Firm* — Campbell Stephenson LLP

(57) ABSTRACT

A method, system, and computer-readable medium for a network interface with adjustable rate are disclosed. For example, one method involves receiving a request to activate a virtual lane of an interface, where the request is received by a first node. The interface is configured to facilitate data communication between the first node and a second node, and the interface includes a plurality of virtual lanes that include at least one active virtual lane, and at least one inactive virtual lane. The method also involves, in response to receiving the request, negotiating with the second node to select an additional virtual lane from the at least one inactive virtual lane. The method involves activating the additional virtual lane. After the activating, the first node and the second node are configured to use the active virtual lane(s) and the additional virtual lane for data communication.

22 Claims, 14 Drawing Sheets

(56) References Cited

U.S. PATENT DOCUMENTS

| | | | |
|---|---|---|---|
| 2006/0251419 A1* | 11/2006 | Zadikian | H04J 14/0227 398/51 |
| 2008/0138075 A1 | 6/2008 | Gustlin et al. | 398/115 |
| 2011/0222402 A1 | 9/2011 | Gai et al. | 370/230.1 |

OTHER PUBLICATIONS

Brooks, Dr. Paul, "100G Pluggable Optics Drive Testing in New Directions," White Paper, JDS Uniphase Corporation, Feb. 2011, pp. 1-8.

Ganga, Ilango, "IEEE 802.3ba 40 and 100 Gigabit Ethernet Architecture," presented at IEEE Com Soc SVC, Oct. 2010, pp. 1-15.

Liu, Cathy, et al., "100 Gb/s: The High Speed Connectivity Race is on," LSI Corporation, Oct. 6, 2010, 25 pages.

Mellanox Technologies, "InfiniBand™ Frequently Asked Questions," Document No. 2078GI, Rev. 1.10, undated, pp. 1-5.

MorethanIP GmbH, "40/100 Gigabit Ethernet PCS Cores Product Brief," Version 1.3, Feb. 2010, 2 pages.

Ixia, "40 and 100 Gbps Higher Speed Ethernet Reference," Rev. A, Sep. 2009, 1 page.

Ixia, "Enabling 100 Gigabit Ethernet Implementing PCS Lanes," Rev. B, Jul. 2011, 15 pages.

Warland, Tim, AppliedMicro, "Understanding Skew in 100GBASE-R4 Applications," Dec. 14, 2011, 13 pages.

Rouse, Margaret, "SerDes (serializer/deserializer)," posted on WhatIs.com, last updated Sep. 2005, 11 pages.

\* cited by examiner

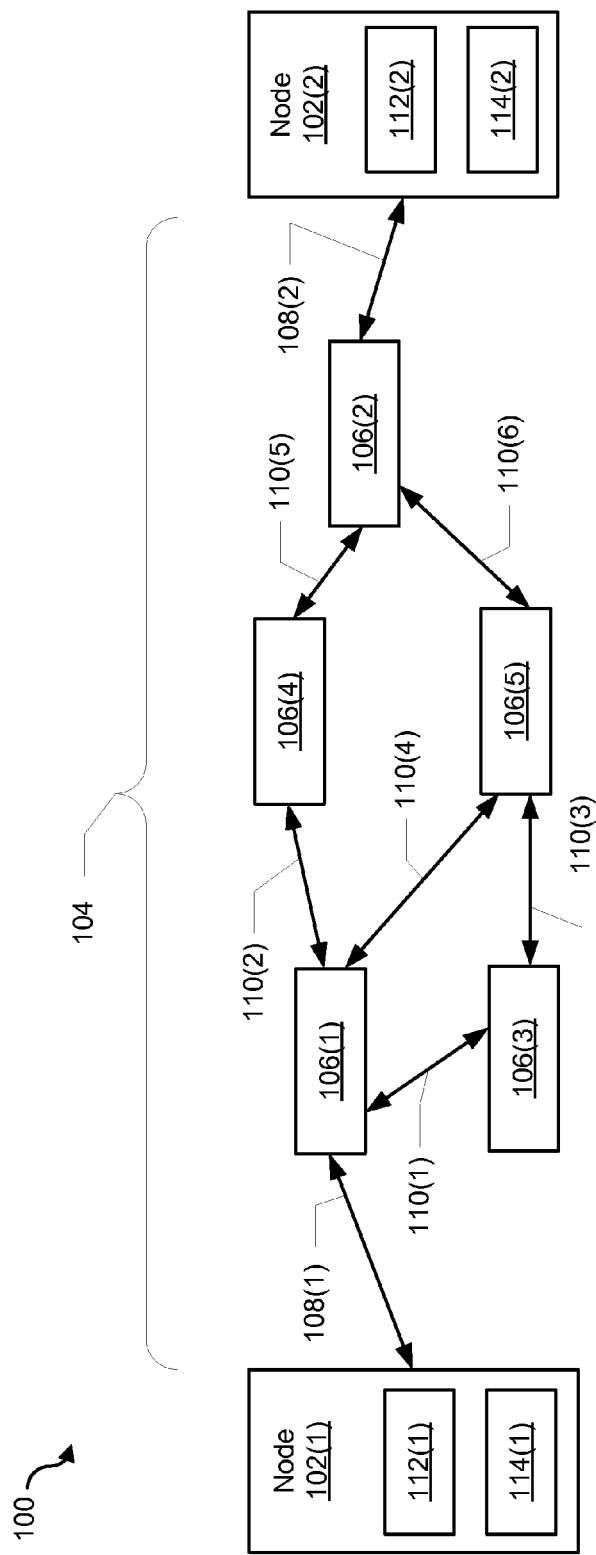
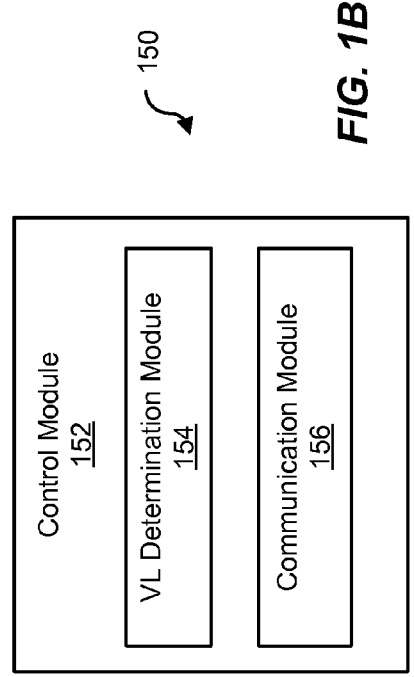
FIG. 1A
FIG. 1B

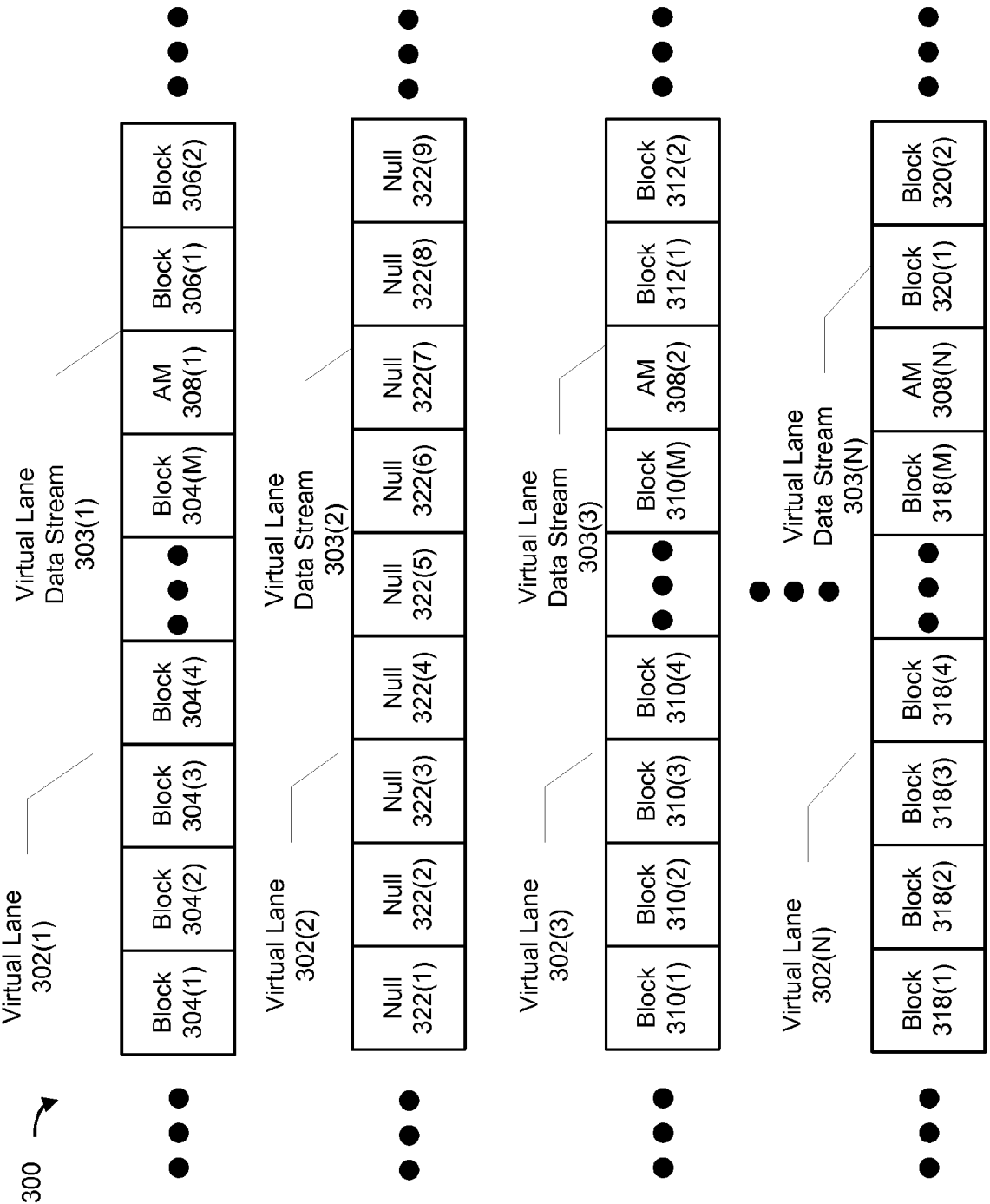

NETWORK INTERFACE WITH ADJUSTABLE RATE

FIELD OF THE INVENTION

The present disclosure relates generally to network communications, and especially to a flexible rate network interface.

BACKGROUND OF THE INVENTION

Communication networks connect network clients, like computers, allow these devices to exchange data with each other. Communication protocols define the techniques and format that these devices use when exchanging data via the communication networks. Communication networks connect the devices over various media, such as optical, electrical, or wireless media, and/or a combination thereof. Furthermore, a network can include network devices that facilitate such communication. These network devices (such as switches, routers, etc.) provide, for example, routing functionality that can route data from one network segment to another network segment within a larger communication network.

A communication network can be characterized, among other things, by the amount of data that can be transmitted per unit of time. This measurement, known as a bandwidth, can be expressed in bits per second (bit/s or bps) For large amounts of data per second, a prefix such as kilo, mega, giga, tera, or the like can be added (e.g., kbit/s, Mbit/s, Gbit/s, Tbit/s, etc.). Thus, a communication network, as a whole, can have an associated bandwidth. Furthermore, two or more network-connected devices can also have an associated bandwidth, which indicates the maximum amount of data (per unit of time) that can be transmitted between these devices.

BRIEF DESCRIPTION OF THE DRAWINGS

The embodiments of the present application may be better understood, and its numerous objects, features, and advantages made apparent to those skilled in the art by referencing the accompanying drawings.

FIG. 1A is a block diagram illustrating a distributed storage system, according to one embodiment.

FIG. 1B is a block diagram illustrating a control module, according to one embodiment.

FIG. 3 is a block diagram illustrating example virtual lanes, according to one embodiment.

Figure 2:
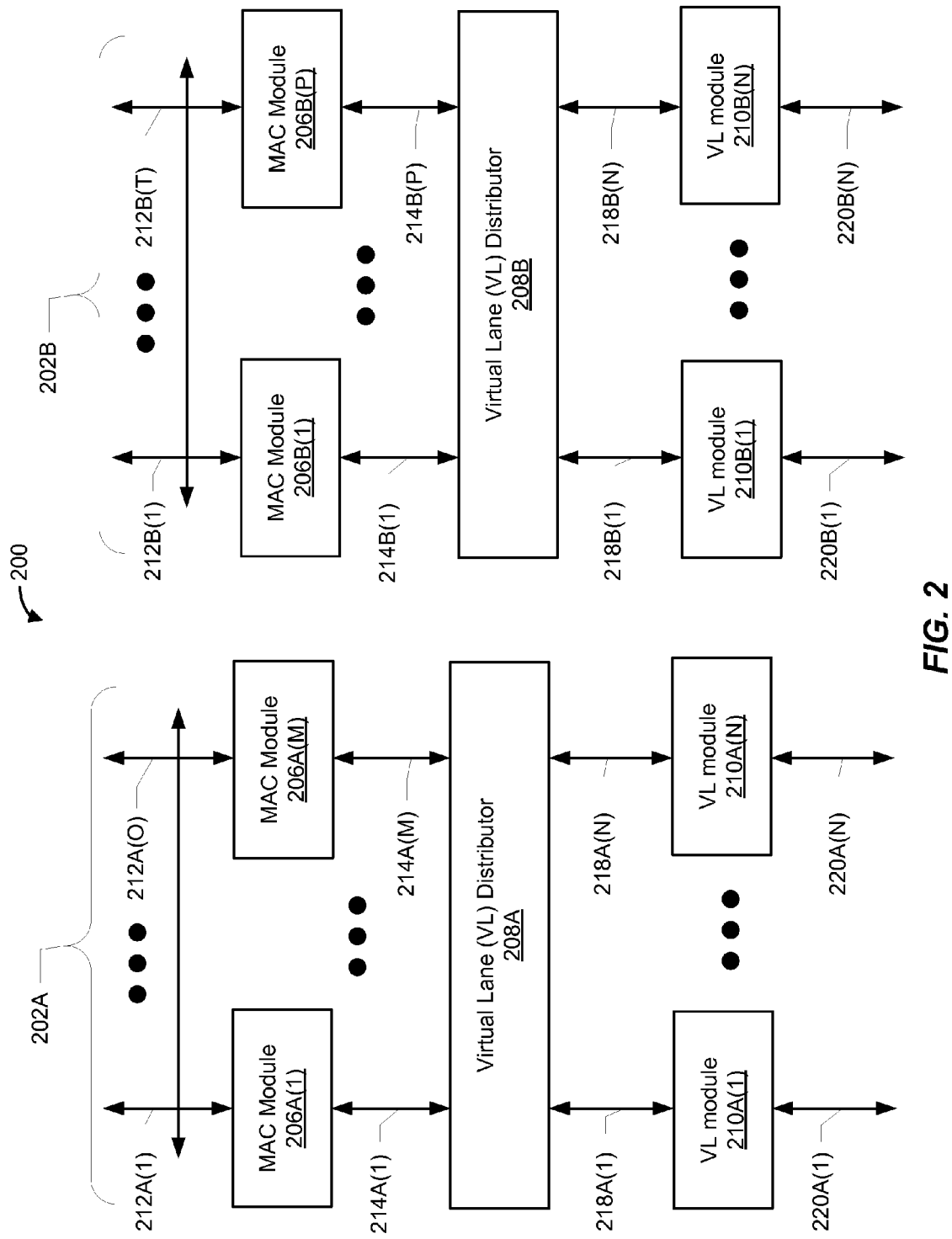
FIG. 2 is a block diagram illustrating example transmit/receive modules, according to one embodiment.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

DESCRIPTION OF EXAMPLE EMBODIMENTS

Overview

In general, methods for using network interfaces with adjustable rate(s), such as those described herein include receiving a request to activate a virtual lane of an interface, where the request is received by a first node. The interface is configured to facilitate data communication between the first node and a second node. The interface includes a plurality of virtual lanes, where the virtual lanes include at least one active virtual lane, and at least one inactive virtual lane. The methods also include, in response to receiving the request, negotiating with the second node, where the negotiating operates to select an additional virtual lane from the at least one inactive virtual lane. The methods also include activating the additional virtual lane, where after the activating, the first node and the second node are configured to use the at least one active virtual lane and the additional virtual lane for data communication.

Example Embodiments

A communication interface facilitates communication of data between two nodes. These nodes, which can be network devices such as routers, can be a part of a larger communication network. The communication interface between these two nodes includes multiple virtual lanes, where each virtual lane (VL) can carry a certain amount of data bandwidth between the two nodes. Traditionally, in a fixed rate communication interfaces that support VLs, the number of VLs being used to transmit and receive data, as well as the bandwidth of the communication interface, are fixed. For example, Ethernet interfaces are typically limited to fixed speeds of 1 GB/s, 10 GB/s, 40 GB/s, and 100 GB/s, with no additional network speeds being available.

An adjustable rate communication interface described herein alleviates many issues associated with such fixed rate communication interfaces. The adjustable rate communication interface (referred to herein as communication interface) allows nodes to negotiate the number of VLs (and thus the bandwidth) to be used for data communication. This negotiation is used to activate (or deactivate) one or more VLs of the communication interface. The nodes can negotiate to activate extra VLs to match a maximum bandwidth allowable by physical connections used by the communication interface. For example, if a maximum bandwidth of the physical connections increases, the nodes can negotiate to activate additional VLs to fill up the extra available bandwidth. Similarly, if a maximum bandwidth of the physical connections decreases, the nodes can negotiate to de-activate additional VLs to match the smaller available bandwidth.

The communication interface includes active and inactive VLs. The active VLs are used to communicate client data in the data plane between the two nodes, as well as for negotiating activation or deactivation of virtual lane(s) via the control plane. The inactive VLs are not used to communicate client data between the two nodes. However, the inactive VLs can be used to negotiate activation or deactivation of virtual lane(s).

Initially, when none of the VLs of the communication interface have been activated, a first node can request that one of the VLs be activated, using either an inactive VL or an alternative communication channel outside of the communication interface. Upon a second node receiving a request to activate a VL (of the communication interface), the second node negotiates this VL activation with the first node. This negotiation can include selecting which inactive VL should be activated. Once the negotiation is complete, the first and/or the second node activates the selected inactive VL. Upon activation, the two nodes can use the communication interface to send and receive client data. As additional VLs are activated, the two nodes can continue using the previously active VLs as well as subsequently-activated VLs. By activating additional VLs, the overall bandwidth of the communication interface is increased. Similar negotiations are used to deactivate an active VL of the communication interface (e.g., in order to decrease the bandwidth of the communication interface).

FIG. 1 is a block diagram illustrating a distributed communication system 100 that includes two nodes 102(1) and 102(2) that are communicatively coupled together by a network 104. Network 104 includes one or more switches 106(1)-106(5) (referred to collectively as switches 106). Furthermore, each of nodes 102(1)-102(2) (referred to collectively as nodes 102) can be communicatively coupled to a larger communication network using one or more additional nodes (not shown). Each such node is a network device that includes one or more network interfaces, and is configured to use various network protocols to convey data from one point (e.g., node 102(1)) in the network to another point (e.g., node 102(2)). In one implementation, each node 102 can be implemented using a router.

In one embodiment, node 102(1) includes a transmit and/or receive module (TR module) 112(1) that facilitates communication over network 104. Similarly, in one embodiment, node 102(2) includes a transmit and/or receive module (a TR module) 112(2) that facilitates communication over network 104. Each TR module can function as either a transmitter and/or a receiver, e.g., as a transceiver that can function as both.

The TR modules enable communication between the nodes, e.g., by taking data generated by a node (in which it is included) and transmitting that data over the network. Similarly, the TR modules also receive data generated by another node (i.e., by another TR module) via the network. TR module 112(1) is communicatively coupled to TR module 112(2) over network 104, by switches 106(1)-106(5). In the implementation shown in FIG. 1, TR module 112(1) is communicatively coupled to switch 106(1) by link 108(1). Similarly, TR module 112(2) is communicatively coupled to switch 106(2) by link 108(2).

Switches 106 in network 104 can be connected using various types of physical connections that allow simplex, half-duplex, and/or full duplex communication. As used herein, switches 106 are network devices that have the capability to forward data at the data link layer (also referred to as layer 2 or L2). In some implementations, switches 106 also have the capability to route data at the network layer (also referred to as layer 3 or L3). Network 104 can be an optical network, such as an Optical Transport network (OTN) (or a variant thereof, such as IP over DWDM (dense wavelength division multiplexing) (IPoDWDM)), a Synchronous Optical Network (SONET) or a Synchronous Digital Hierarchy (SDH), which uses optical switches 106 that are interconnected by optical communication media (e.g., fiber optic cables). In this example, optical switches 106 are interconnected by optical links (e.g., sections of fiber optic cable) 110(1)-110(6) (collectively, links 110). However, in other embodiments, network 104 can be implemented using another type of a high-speed network, and thus use another type of switches.

Switches 106(1) and 106(2) can be optical switches that communicate with nodes 102 (over links 108(1) and 108(2)) using a first network protocol, while communicating with other switches using a second network protocol (which can be different from the first network protocol). In other words, switches 106(1) and 106(2) can receive data using the first network protocol (e.g., using Ethernet), and then propagate this data to the other switches using the second network protocol (e.g., using SONET). Switches 106(1) and 106(2) can also receive data (from other switches) using the second network protocol (e.g., SONET), and then propagate this data to a respective node using the first network protocol (e.g., using Ethernet).

In some embodiments, links 108 implement a communication protocol using wired or wireless signal(s), whereas links 110 implement a communication protocol using optical signal(s). In one implementation, links 108 are implemented using multiple physical wired connections, whereas links 110 are implemented using fiber optic cables. However, in alternative embodiments, links 108 and links 110 are implemented using the same media type.

Data is communicated between nodes 102 over a communication interface. The communication interface is an arrangement of one or more communication channels that facilitates data communication between the nodes. The communication interface uses one or more virtual lanes (VLs) to facilitate communication of streams of data (i.e., data streams) between the nodes. A virtual lane can be thought of as a logical data channel that coexists with other logical data channels on the same physical connection. In other words, a single physical connection can carry multiple VLs. Link 108(1) can be implemented using a physical connection (also referred as a physical link) that has a certain maximum bandwidth. For example, a physical link with a bandwidth of 20 GB/s can carry two VLs, where each VL has a bandwidth of 10 GB/s. The same physical link is also capable of carrying four VLs if each VL has a bandwidth of 5 GB/s.

Data is forwarded using VLs through network 104. However, each data sent using each VL can be forwarded using a different path through network 104. For example, a first active VL can be configured on links 108(1), 110(2), 110(5), and 108(2), such that the first VL extends from node 102(1) to 102(2) through switches 106(1), 106(4), and 106(2). In this example, data sent using the first active VL is forwarded from node 102(1) through switches 106(1), 106(4) and 106(2). A second active VL can be configured on links 108(1), 110(1), 110(3), 110(6), and 108(2), such that the second VL extends from node 102(1) to 102(2) through switches 106(1), 106(3), 106(5), and 106(2). In this example, data sent using the second active VL is forwarded from node 102(1) through switches 106(1), 106(3), 106(5) and 106(2). It is noted that a single VL can be configured to forward data using different media types, such as over links 108 and links 110.

A data stream (also referred to as a data pipe) can include multiple and sequential data blocks. Different data blocks from the same data stream can be sent via different active VLs from the first node to the second node. These VLs can be configured over the same path, e.g., using links 108(1), 110(2), 110(5), and 108(2). Even though these data blocks are sent using the same path, the VLs can still be skewed with respect to each other. As a result, data from this data stream that is sent using the different VLs can be received out-of-order at the second node.

To preserve the order of received data (at the receiving node), the data blocks are mapped into the active VLs (e.g., such as using a round robin fashion, or another technique), and indicators (e.g., alignment markers) are periodically inserted into these active VLs. The receiving node uses these indicators (e.g., alignment markers) to align the received VLs, and order the received data blocks into a data stream that corresponds to the data stream sent by the transmitting node. The use of these indicators for alignment is described in more detail below, such as with reference to FIG. 3.

In general, two or more VLs are aligned when both the transmitting and the receiving node are configured to use the alignment markers in these VLs for data communication. Thus, VLs on a transmitting node are aligned when the transmitting node is configured to insert AMs into the VLs for a data stream being sent. Similarly, VLs on a receiving node are aligned when the receiving node is configured to process and align data received using these VLs to order the data, based on the AMs, into a data stream that corresponds to the data stream sent by the transmitting node.

Each of nodes 102 includes a control module, i.e., control modules 114(1) and 114(2), respectively. Control modules 114(1) and 114(2) (referred to collectively as control modules 114) can activate or deactivate a VL. In one embodiment, a control module receives an external request to activate or deactivate a VL, such as from a network administrator. In another embodiment, a control module itself can determine whether to activate or deactivate a virtual lane. Whenever a control module needs to activate a VL (either due to an internal determination or an external request), a request to activate a virtual lane is generated by the virtual lane determination module within that control module.

FIG. 1B is a block diagram 150 of one embodiment of a control module 152. As shown, control module 152 includes a VL determination module 154 and a communication module 156. VL determination module 154 determines whether an inactive VL should be activated, or whether an active VL should be de-activated, from a communication interface. VL determination module 154 can thus determine to activate extra VL(s) to match a maximum bandwidth allowable by physical connections of a path being used by nodes 102 (such as if switches 106 offer extra bandwidth). Similarly, VL determination module 154 can determine to de-activate VL(s) to match a smaller bandwidth allowable by physical connections of that path (such as if one of switches 106 being used is not useable).

VL determination module 154 can also select a VL to be activated (or deactivated). VL determination module 154 then generates a request to activate (or to de-activate) a VL. Communication module 156 then receives this request, and proceeds with negotiating the requested action (e.g., either activating or de-activating a VL), such as by using a respective TR module to communicate with the other node. As a result, the VL determination module matches the bandwidth of the VLs to the available bandwidth of the physical connection(s).

With reference to FIG. 1A, in one embodiment, a network entity, such as a network administrator, determines whether to activate or deactivate a VL. In this case, the network administrator would communicate a request (to activate or deactivate a VL) to one or more of control module(s) 114. The network administrator can be implemented as a supervisory monitoring and control module that monitors various parameters of the network. With brief reference to FIG. 1B, in this case, communication module 156 receives such a request from the network administrator. Upon receiving such a request, each control module proceeds (such as by using a respective communication module) with negotiating the requested action (e.g., to activate or deactivate a VL), such as by using a respective TR module to communicate with the other node.

In one implementation, each of switches 106(1)-106(5) can propagate data corresponding to a different number of VLs. The maximum number of VLs (active and inactive) that can be used by a communication interface between nodes 102(1) and 102(2) can be determined by the switch (in the communication interface) with the lowest available physical bandwidth. For example, in a communication interface using five switches 106(1)-106(5), if each of switches 106(1)-106(4) can propagate up to 100 GB/s, and switch 106(5) can only propagate data up to 80 GB/s, then the highest bandwidth useable by this communication interface is 80 GB/s. In this case, the determination module would indicate that the nodes should activate enough VLs to match this 80 GB/s physical bandwidth.

Furthermore, the number and/or the type of the network over which the nodes communicate can change over time. For example, the number, operating status, and/or type of switches in network 104 can change. If, for example, switch 106(5) goes off-line (e.g., it is damaged, or reboots, or has a power issue, etc.), nodes 102 may need to reconfigure the number of active VLs (as well as the total number of active and inactive VLs) being used for communication (i.e., such as to match the available physical bandwidth).

As a result, the bandwidth of the communication interface can be increased or decreased. A network administrator can request to deactivate a VL if the communication needs of the overall system have decreased. For example, if a certain switch, such as a switch 106(5) goes off-line, the control module can deactivate one or more virtual lanes, as the overall theoretical bandwidth (i.e., the physical bandwidth) of network 104 has decreased. Similarly, a network administrator can request to activate a VL if the communication needs of the overall system have increased. For example, if another switch is added to the path being used by nodes 102, then the control module can activate one or more virtual lanes, as the available physical bandwidth of network 104 has increased.

Even in situations where a theoretical bandwidth (i.e., the maximum bandwidth allowable by the physical connections of used path(s)) of switches 106 is constant, activation of only a portion of virtual lanes can have various advantages over activating all of the virtual lanes. For example, if not all possible virtual lanes are activated, then switches 106 can consume less power instead of operating at full capacity. Also, the remaining bandwidth (that is not being used by the active virtual lanes) of network 104 can be used for other communication.

The VLs can be mapped onto the physical links (as implemented using links 108(1) and 108(2)) using one or more techniques, including bit-level muxing (or demuxing), or another type of multiplexing/demultiplexing. In one implementation, the TR modules perform a bit-level muxing of data from the VLs onto a given physical link, or a bit-level demuxing of data from a given physical link onto the VL. The bit-level muxing (or demuxing) can be of a blind bit-level muxing/demuxing type, or another type, as desired. Each physical link can be implemented by multiple electrical lanes or multiple optical lanes, which could in turn be implemented using individual fibers, individual wavelengths or a combination of both.

The control module can use this multiplexing/demultiplexing type as an additional constraint when determining which and how many VLs to activate/deactivate. For example, if a blind bit-level multiplexing/demultiplexing is used, the number of VLs selected (by the control module) to transmit a given data stream (of a given bandwidth) should be a least common multiple (LCM) of all the physical lane widths transited from the sending node to the receiving node. With reference to FIG. 1, if the data is being sent from node 102(1) to node 102(2) via switching nodes 106(1), 106(4) and 106(2), the control module determines the LCM of links 108(1), 110(2), 110(5) and 108(2). For example if links 110 mentioned above are all 100GBASE-LR4 optical links (that have four optical lanes each) and links 108 mentioned above are based on CFP transceiver modules with a 10×10G electrical interface, then the minimum number of VLs that can be used is 20, as the LCM of 4 and 10 is 20. The control module then determines, such as based on a physical bandwidth that has changed, how many VLs can be used for the given type(s) of physical links used by the path between the nodes.

FIG. 2 is a block diagram illustrating example TR modules, according to some embodiments. A TR module 202A can implement TR module 112(1) of node 102(1). Similarly, a TR module 202B can implement TR module 112(2) of node 102(2). TR modules 202A and 202B are also collectively referred to herein as TR modules 202. TR module 202A includes one or more media access control (MAC) modules 206A(1)-206A(M), a virtual lane (VL) distributor 208A, and one or more VL modules 210A(1)-210A(N). Similarly, TR module 202B includes one or more media access control (MAC) modules 206B(1)-206B(P), a virtual lane (VL) distributor 208B, and one or more VL modules 210B(1)-210B(S). It is noted that MAC modules are collectively referred to herein as MAC modules 206, VL distributors are collectively referred to herein as VL distributors 208, and VL modules are collectively referred to herein as VL modules 210.

Each one of MAC modules (e.g., MAC modules 206A) generates one or more processed data streams that, after some processing by a VL distributor and VL module(s), become VL streams (for active VLs). In one embodiment, each MAC module can be configured to generate a different number of processed data streams (each of which becoming a separate VL stream). For example, the TR module can use a first MAC module to generate data streams for three VLs, and use a second MAC module to generate data streams for two VLs. It is noted that the MAC modules of a receiving TR module (e.g., MAC modules 206B) can similarly each process a different number of VLs. In other words, each MAC module can handle a different number of VLs.

Furthermore, in one embodiment, each MAC module can be configured to generate (or receive) a processed data stream having a different bandwidth. For example, to use five VLs at a total bandwidth of 65 GB/s, the TR module can use a first MAC module to generate data streams for two VLs, each having a bandwidth of 25 GB/s, and a second MAC module to generate data streams for three VLs, each having a bandwidth of 5 GB/s. In other words, the TR module can configure the number of active VLs of each MAC module.

Depending on implementation, the TR module and/or the corresponding control module can select which MAC module should activate or deactivate a certain VL. This selection includes determining which MAC module has the bandwidth to activate/deactivate a VL (e.g., based upon the maximum bandwidth that the MAC module can handle, as well as on the current bandwidth being handled by that MAC module). If different VL rates between MAC modules are supported, the control module and/or the TR module determine which MAC module(s) support the requested bandwidth change. In one implementation, each MAC module has a variable bandwidth that can be set by the TR module. In another implementation, the MAC modules have static bandwidth characteristics, and thus the TR module allocates VL handling based on these static characteristics.

Each VL stream includes a certain amount of data separated by indicators, e.g., alignment marker (AM). These indicators are used by VL distributors to mark beginning and/or end of each group of data blocks (as shown in FIG. 3). The indicators can also be used to indicate requests to activate or deactivate a VL. Furthermore, the indicators can also be used to perform negotiation when attempting to activating or deactivating VLs. Methods of FIGS. 4-7 illustrate such negotiations, whereas FIG. 3 illustrates one embodiment of VL streams.

In some embodiments, a communication interface between two nodes includes a certain number of available VLs, some of which can be active, while others can be inactive. This number of available VLs is referred to herein as a VL pool. The number of VLs available in a VL pool can fluctuate depending on the number/type/condition of switches in a network, e.g., switches 106 in network 104. For example, nodes 102(1) and 102(2) can have a VL pool with four VLs. Two of these VLs can be active, and the other two VLs can be inactive. Control modules 114(1) and 114(2) can negotiate activating inactive VL(s) from the VL pool, such as described below with reference to FIGS. 4-5. Similarly, control modules 114(1) and 114(2) can negotiate deactivating active VL(s) from the VL pool, such as described below with reference to FIGS. 6-7. In one embodiment, upon start-up, control modules 114(1) and 114(2) can negotiate using a default VLs on start-up, such as described below with reference to FIGS. 8 and 9.

In one implementation, MAC modules 206A of TR module 202A receive one or more data streams 212(1)-212(O). These data streams are processed by MAC modules 206A, such as to generate processed data streams 214A(1)-214A(M) that are used to generate VL streams. As described above, the processing being performed by the MAC modules can include distributing data across the processed data streams (which are then processed to become VLs). In one scenario, a single MAC module 206A(1) receives a single data stream 212A(1), which is processed into processed data stream 214A(1) (and subsequently distributed across the VL streams).

Processed data streams 214A are received and processed by VL distributor 208A, which can support data streams having different rates. VL distributor 208A generates data streams 218A(1)-218A(N), each of which corresponds to a virtual lane stream. For example, VL distributor 208A can perform 64/66 b encoding and/or scrambling to generate one or more data streams 218A(1)-218A(N). In general, 64/66 b encoding is performed to convert 64 bit data (as received from data streams 214(1)-214(0)) to 66-bit data that includes the 64-bit data and a 2-bit pre-amble to indicate any state changes in the data. This 66-bit data (also referred to as line code data) is then transmitted using the data streams 218A. Similarly, the VL distributor of the receiving TR module receives the 66-bit data (that is typically transmitted using data streams on high-speed networks), and performs reverse 64/66 b encoding to generate 64-bit data that is typically used internally by the nodes.

Data streams 218A are received, processed, and propagated by VL modules 210A(1)-210A(N) as VL streams 220A(1)-220A(N). VL modules 210A can add and/or modify AM for each VL. In one implementation, data streams 218A are transmitted using a parallel interface, and VL modules 210A serialize this parallel data, such as by performing Serializer/Deserializer (SerDes) functionality. In general, a SerDes converts data from serial data to parallel data (and vice-versa). VL streams 220A (in serial data form) can be transmitted over network (e.g., network 104) to TR module 202B, i.e., by using switches 106.

TR module 202B receives one or more VL streams 220B(1)-220B(N). In one implementation, VL streams 220B can correspond to VL streams 220A that are transmitted using a network. VL streams 220B are received, processed, and propagated by VL modules 210B(1)-210B(N) as data streams 218B(1)-218B(N). VL modules 210B receive and process each VL, such as by performing serial to parallel conversion of serial data included in VL streams 220B (e.g., by performing SerDes functionality). VL distributor 208B receives the parallel data in data streams 218B, which is then processed (e.g., including aligning using the AM markers) and sent as data streams 214B(1)-214B(P) to MAC modules 206B. MAC modules 206B can process and propagate the received data using data streams 212(B).

FIG. 3 is a block diagram 300 illustrating example virtual lane data streams, according to some embodiments. FIG. 3 illustrates VL data streams 303(1)-303(N) for VLs 302(1)-302(N), respectively, such as VL data streams that are communicated using VLs between nodes 102(1) and 102(2). Thus, the TR modules can transmit data using VLs 302(1)-302(N). In this block diagram 300, VLs 302(1) and 302(3)-302(N) are active VLs, and VL 302(2) is an inactive VL. Each VL data stream contains multiple groups of data blocks, where one group of data blocks is separated from a previous and a subsequent group of data block by alignment markers.

VL streams 303(1)-303(N) can implement VL streams 220A(1)-220A(N) that are transmitted by TR module 202(A) and/or VL streams 220B(1)-220B(N) that are received by TR module 202B. VL data stream 303(1) includes multiple groups of data blocks, where groups of data blocks are separated from a subsequent and a prior data group of data blocks by indicators. With reference to VL stream 303(1), data blocks 304(1)-304(M) of a first group of data blocks are separated from data blocks 306 of a second group of data blocks by an indicator (implemented as an alignment marker (AM)) 308(1)). The control module can differentiate an AM from data blocks by the position of each AM (such as every 16,384 data block), by special values (such as each AM holds a unique value), and/or using other means.

Each AM includes alignment information that can indicate, for example, virtual lane number, status of the virtual lane, virtual lane rate, and virtual lane messaging (i.e., control messages including confirmations, indications, requests, etc.). The virtual lane number can indicate the number of the current VL, the total number of VLs in the VL pool. The status of the VL can indicate whether the current VL is active or inactive. The virtual lane rate can indicate the bandwidth of the current VL. The VL messaging can include an indication, a control message, and/or various error-checking data. The control messages and indications can be used by the control modules to activate or to deactivate a VL, as described with reference to the methods of FIGS. 4A-9.

Similarly, VL data streams 303(3)-303(N) include multiple groups of data blocks, each group separated by AMs, such as data blocks 310(1)-310(M) and data blocks 312 separated by AM 308(2), and data blocks 318(1)-318(M) and data blocks 320 separated by AM 308(N), respectively. VL data stream 302(2) includes multiple null (i.e., empty of user data) data blocks 322(1)-322(9) that can be sent by one of the nodes as part of a negotiation protocol, such as to deactivate a VL. However, other indications (e.g., data indication blocks) can be used instead during negotiations of VL deactivation.

It is noted that the methods of FIGS. 4A-9, described below, illustrate various embodiments and aspects of the flexible network interface. As will be appreciated in light of the present disclosure, these methods may be modified in order to derive alternative embodiments. Also, some operations in these embodiments are shown in sequential order. However, certain operations may occur in a different order than shown, certain operations may be performed concurrently, certain operations may be combined with other operations, and certain operations may be absent in another embodiment(s).

Furthermore, methods of FIGS. 4A-7 are typically executed for each active VL of a communication interface. For example, if a communication interface between two nodes includes three active VLs, then a control module of each node would execute one or more of methods of FIGS. 4A-7 to monitor the communication of each of its active VLs, such as to determine whether the other node is requesting a certain VL to be de-activated. Thus, with regard to the methods of FIGS. 4A-7, whereas a request to deactivate a VL is either received from a network entity (such as a network administrator, or it generated by that node's control module), an indication of deactivation of a certain VL is received from another node's control module (e.g., an indication that is generated by the other node in response to that other node receiving a request to deactivate a VL)).

Figure 4A:
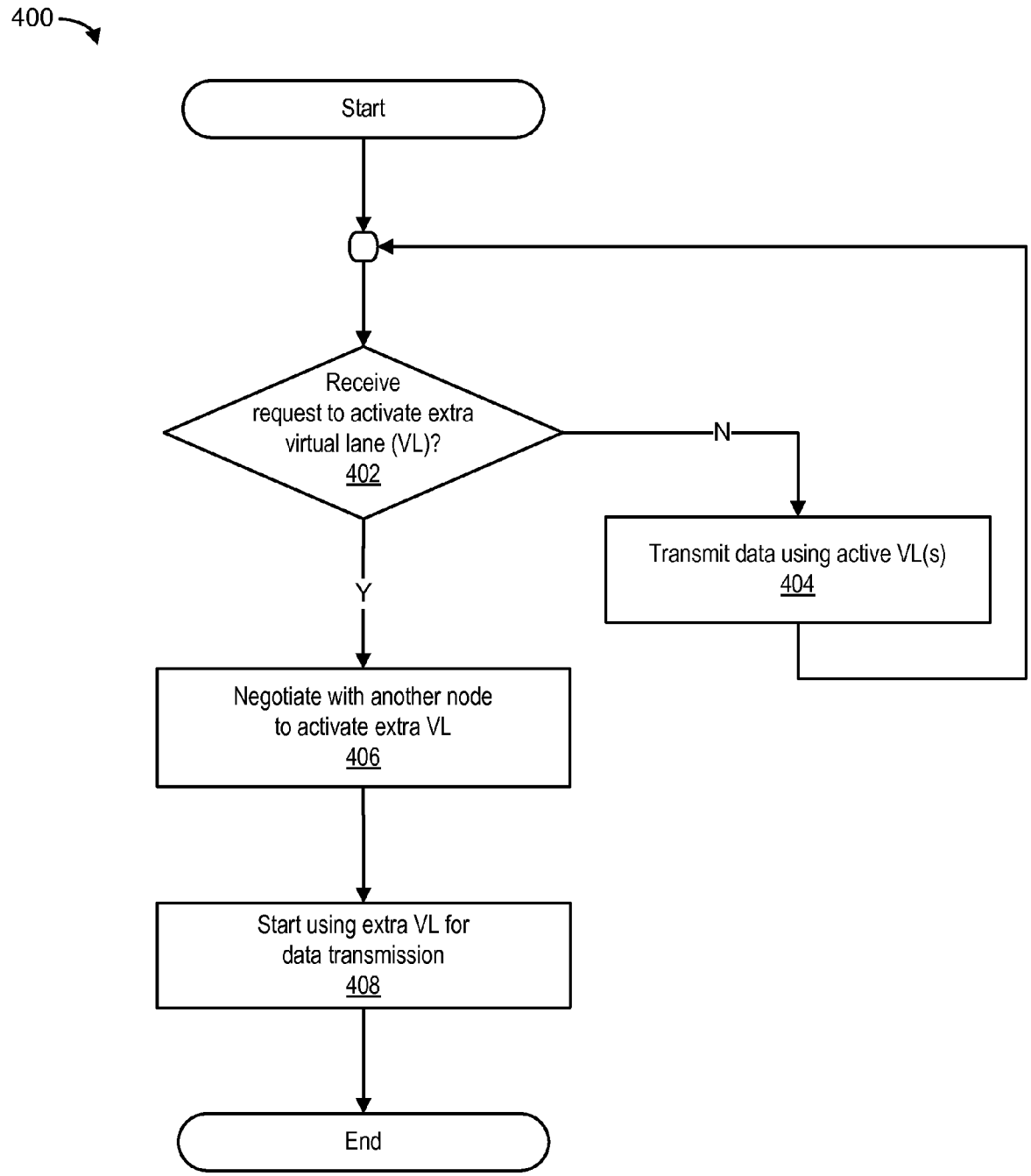
FIG. 4A is a flowchart illustrating a method for activation of a virtual lane, according to some embodiments.

FIG. 4A illustrates a method 400 for activation of a virtual lane, according to some embodiments. Method 400 is described with reference to variations of the elements described in connection with FIG. 1. In one embodiment, at least portions of method 400 are executed by the nodes of FIG. 1, such as by control module 114(1) of node 102(1) that initiates the VL activation process with regard to the other node. The VL can be activated to match an increased physical bandwidth available to nodes 102.

In element 402, a control module detects whether a request to activate a virtual lane (VL) is received. This request can indicate that an inactive VL, of a communication interface between nodes 102(1) and 102(2), should be activated. The activate VL request can be received by the TR module (e.g., TR module 202A) from another module, such as a monitoring module that monitors the network, or a system administrator. The TR module then communicates this request to the control module.

In one embodiment, the activate VL request can be generated by the control module itself, such as when determining that an extra VL is needed to timely communicate data between the nodes (e.g., if this data communication is not meeting some Quality of Service (QoS) parameter). Other implementations of generation of the activate VL request are contemplated. If the control module detects the request, element 406 is performed. Otherwise, if the control module does not detect such request, element 404 is performed.

In element 404, the TR module (e.g., such as by being instructed by the control module) transmits data using the active VLs. For example, with reference to FIG. 3, a VL pool includes four VLs—VLs 302(1)-302(4) (i.e., N=4). There are two active VLs, VLs 302(1) and 302(3), which are being used to transmit data between nodes. VLs 302(2) and 302(4) are inactive VLs. Inactive VLs, in some implementations, do not carry any data, e.g., data blocks are empty or null. In another implementation, the inactive VLs carry data having a fixed pattern. In one implementation, if data blocks are empty or null (or contain a fixed pattern), any AMs of the inactive VLs are also empty or null. In some implementations, any such data on the inactive VLs is simply ignored.

In element 406, the control module negotiates, with other node, to activate extra VL(s). For example, the control module (that received the request to activate a VL) negotiates (e.g., by using the TR module) with the other control module to activate extra VL(s). This negotiation can be performed using the indicators, e.g., using alignment markers (AMs). An example implementation of such negotiation is described below with reference to FIG. 4B. For example, negotiation to activate a third VL, VL 302(2) is performed between the two nodes using one or more of VLs 302(1) and 302(3).

In element 408, the TR module (e.g., such as by being instructed by the control module) transmits data using the active VLs that includes the extra VL(s). For example, with reference to FIG. 3, after a successful negotiation of element 404, nodes communicate using VLs 302(1)-303(3). It is noted that if negotiation of element 406 is not successful, then nodes communicate using VLs 302(1) and 302(2) only. In other words, the transmitting node will generate and insert alignment markers in the active VLs, including the extra VL, and the receiving node will expect to receive data and AMs on these active VLs.

Figure 4B:
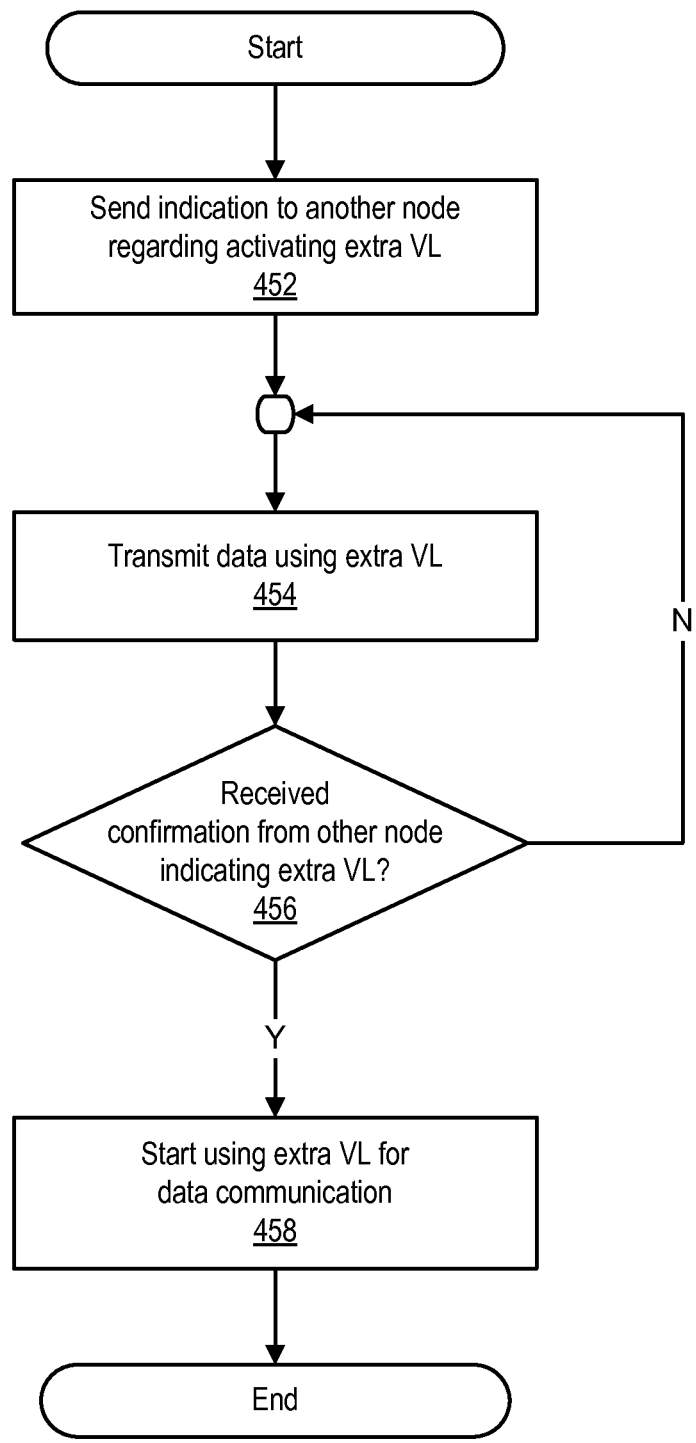
FIG. 4B is a flowchart illustrating a method for negotiation of activating a virtual lane, according to some embodiments.

FIG. 4B illustrates a method 450 for negotiation of activating of a virtual lane, according to some embodiments. Method 450 is described with reference to variations of the elements described in connection with FIG. 1. In one embodiment, at least portions of method 450 are executed by the nodes of FIG. 1, such as by control module 114(1). Method 450 can implement element 406 of method 400.

In element 452, the TR module (such as by being instructed by the control module) sends an indication, to another node, regarding the extra VL. For example, the TR module can send alignment information using an AM of an already active VL, such as AM 308(1) of VL 302(1), to the other control module. Such alignment information can include, for example, the number of the VL of the VL pool, whether the VL is active/inactive, a bandwidth of the VL, an indication, a control message, and/or various error checking data.

In element 454, the TR module (such as by being instructed by the control module) transmits data to another node using the extra VL(s). For example, the TR module can transmit null data, or other data, to the other control module using VL 302(3). At this point, any such data is typically ignored by the other control module, as the negotiation of activating VL 302(2) is not yet complete. For example, VLs 302(1)-302(3) are not yet aligned. In general, two or more VLs are aligned when both control modules in a communication interface (between nodes 102(1) and 102(2)) agree on using these VLs as active VLs for communication of data streams. Once the VLs are aligned, data from a data stream is distributed among the VLs of the transmitting node, and the receiving node expects to receive data using these VLs.

In element 456, the control module detects whether a confirmation of activating the extra virtual lane (VL) is received. For example, the control module can detect that the TR module has received a confirmation of alignment of VL 302(2). This confirmation can be received, for example, using any of AMs of VLs 302(1)-302(3), i.e., using alignment markers of the active VLs or using alignment markers of the to-be activated VL. In other words, the AM includes the confirmation. If the control module detects the confirmation, element 458 is performed. Otherwise, if the control module does not detect such request, element 454 is performed. It is noted that the control module can also implement time-out/error recovery techniques (not shown) that would indicate that the negotiation is not successful.

In element 458, the TR module (such as by being instructed by the control module) transmits data using the active VLs that includes the extra VL(s). For example, with reference to FIG. 3, after a successful negotiation, nodes communicate using VLs 302(1)-303(3).

In one embodiment, the control modules of the two nodes can implement an additional confirmation mechanism to further coordinate the timing of using the VLs. For example, once all of the VLs are aligned, the transmitting node can then use the AMs of the active VLs to indicate when it will start using the new VL to transmit data; and the receiving node will look for this indication in the active VL's AMs to determine when to expect using the newly activated VL. For additional robustness, these indications can be implemented using several consecutive AMs, e.g., as a countdown to using all of the active VLs.

Figure 5:
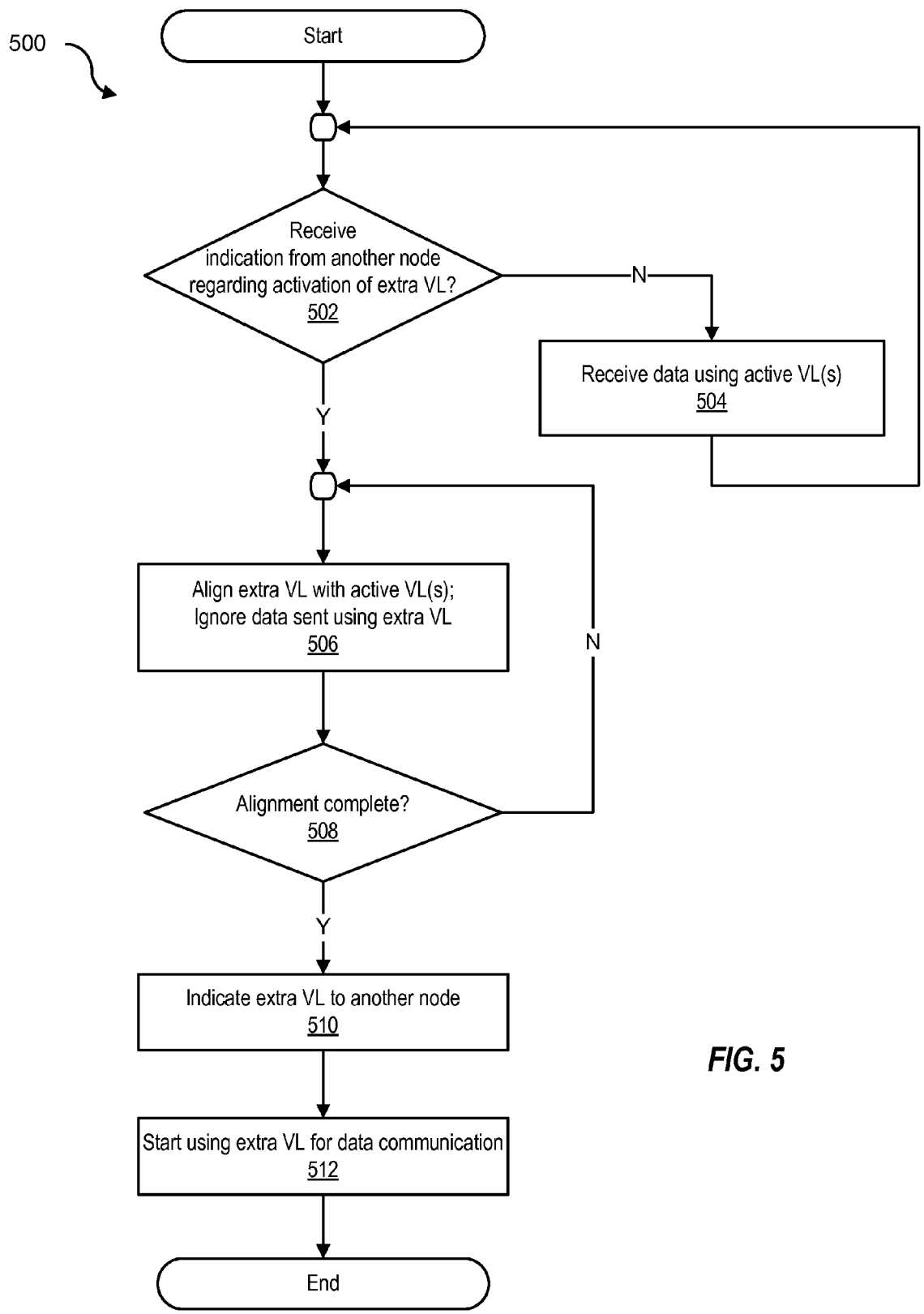
FIG. 5 is a flowchart illustrating a method for activation of a virtual lane, according to some embodiments.

FIG. 5 illustrates a method 500 for activating a virtual lane on the receiving node, according to some embodiments. Method 500 is described with reference to variations of the elements described in connection with FIG. 1. In one embodiment, at least portions of method 500 are executed by the nodes of FIG. 1, such as by control module 114(2) of node 102(2) that receives an indication of activation from node 102(1).

In element 502, a control module detects whether an indication is received from another node regarding an extra VL. This indication can be received by the TR module (e.g., TR module 202B) via a VL, e.g., from the other control module. As described, such an indication can be made using an Alignment Marker (AM) of one of the active VLs, such as via AM 308(1) of VL 302(1). The TR module then communicates this indication to the control module. If the control module detects the indication, element 506 is performed. Otherwise, if the control module does not detect such request, element 504 is performed.

In element 504, the TR module (e.g., such as by being instructed by the control module) transmits data using the active VLs. For example, if there are two active VLs (VLs 302(1) and 302(3)), the TR module receives data using both VLs.

In element 506, the control module aligns the active VLs with the extra VL. Such VL alignment includes the control module configuring the TR module to receive and distribute data from the active VLs, including the extra VL. Once these VLs are aligned on the receiving node, the TR module (of the receiving node) is ready to distribute data from the data stream(s) received from the two active VLs (VLs 302(1) and 302(3)) and the extra VL.

In element 508, the control module determines whether the VL alignment is complete. This determination can include determining whether the TR module (of the receiving node) is configured to receive data and AM markers over the active VLs that include the extra VL. If the control module determines that the alignment is complete, element 510 is performed. Otherwise, if the control module determines that the alignment is not complete, element 506 is performed.

In element 510, the TR module (such as by being instructed by the control module) indicates to the other node that the extra VL is aligned. The TR module (of the receiving node) can indicate (to the respective transmitting node, i.e., the node that initiated the activation of the extra VL) that the extra VL is aligned. This indication can be implemented using a confirmation that is sent (by the receiving node) using the alignment marker of the extra VL (and/or of the other already-active VLs).

In element 512, the TR module (e.g., such as by being instructed by the control module) transmits the data using the active VLs that includes the extra VL(s). For example, with reference to FIG. 3, after a successful negotiation, nodes communicate using VLs 302(1)-303(3).

In one embodiment (as described above with reference to element 458), the control modules of the two nodes can implement an additional confirmation mechanism to further coordinate the timing of using the VLs. For example, once all of the VLs are aligned, the receiving node can wait on indications from the transmitting node that would indicate when the transmitting node will start using the new VL to transmit data. These indications can be sent by the transmitting node using several consecutive AMs, e.g., as a countdown to using all of the active VLs.

Figure 6A:
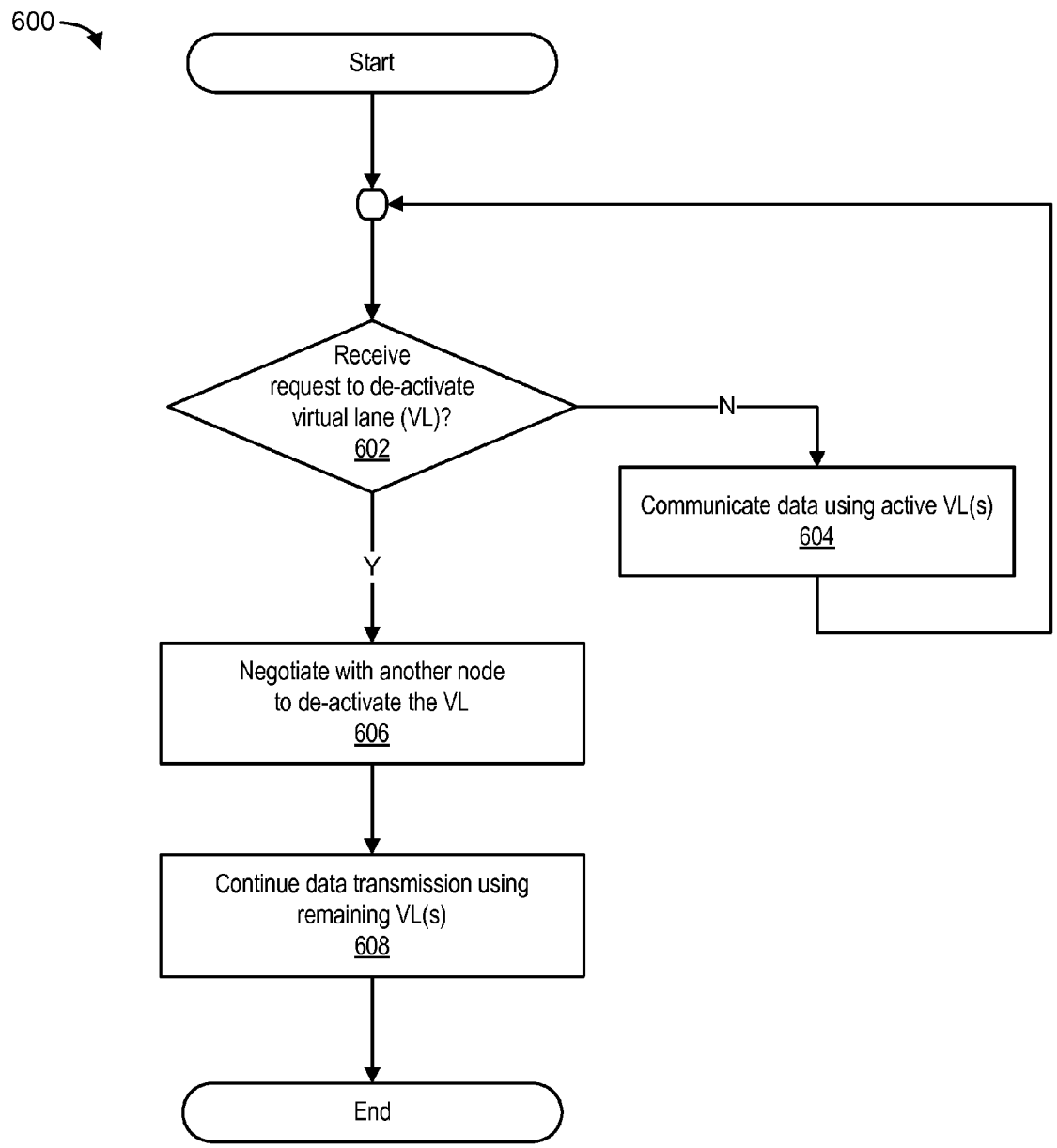
FIG. 6A is a flowchart of illustrating a method for deactivation of a virtual lane, according to some embodiments.

FIG. 6A illustrates a method 600 for deactivation of a virtual lane, according to some embodiments. Method 600 is described with reference to variations of the elements described in connection with FIG. 1. In one embodiment, at least portions of method 600 are executed by a node of FIG. 1, such as by control module 114(1) of node 102(1) that initiates the deactivation process with regard to the other node. The VL can be de-activated to match a decreased physical bandwidth available to nodes 102.

In element 602, a control module detects whether a request to deactivate a virtual lane (VL) is received. The deactivate VL request can be received by the TR module (e.g., TR module 202A) from another module, such as a monitoring module that monitors the network, or a system administrator. The TR module then communicates this request to the control module. In one embodiment, the deactivate VL request can be generated by the control module itself, such as when determining that the communication interface can use one less VL and still timely communicate data between the nodes. However, other implementations of generating the deactivation VL request are contemplated. If the control module detects the request, element 606 is performed. Otherwise, if the control module does not detect such request, element 604 is performed.

In element 604, the TR module (e.g., such as by being instructed by the control module) transmits data using the active VLs. For example, with reference to FIG. 3, a VL pool includes four VLs—VLs 302(1)-302(4) (i.e., N=4). There are three active VLs, VLs 302(1)-302(3), which are being used to transmit data between nodes.

In element 606, the control module negotiates, with other node, to deactivate a VL. For example, the control module (that received the request to deactivate a VL) negotiates (e.g., by using the TR module) with the other control module to deactivate a VL. In one embodiment, this negotiation can be performed using the indicators, e.g., using alignment markers (AMs) of the VL to be de-activated and/or the other active VL(s). In this embodiment, the control module sends (e.g., by using the TR module) deactivation messages to the other node using the AMs of the active VL(s). In another embodiment, this negotiation can be performed using the data blocks of the VL to be de-activated. Example implementations of such VL deactivation negotiations are described below with reference to FIG. 6B.

In element 608, the TR module (e.g., such as by being instructed by the control module) transmits data using the active VLs that do not include the deactivated VL(s). For example, with reference to FIG. 3, after a successful negotiation of element 604, nodes communicate using VLs 302(1) and 303(3), as VL 302(2) is deactivated. It is noted that if negotiation of element 606 is not successful, then nodes continue to communicate using VLs 302(1)-302(3).

Figure 6B:
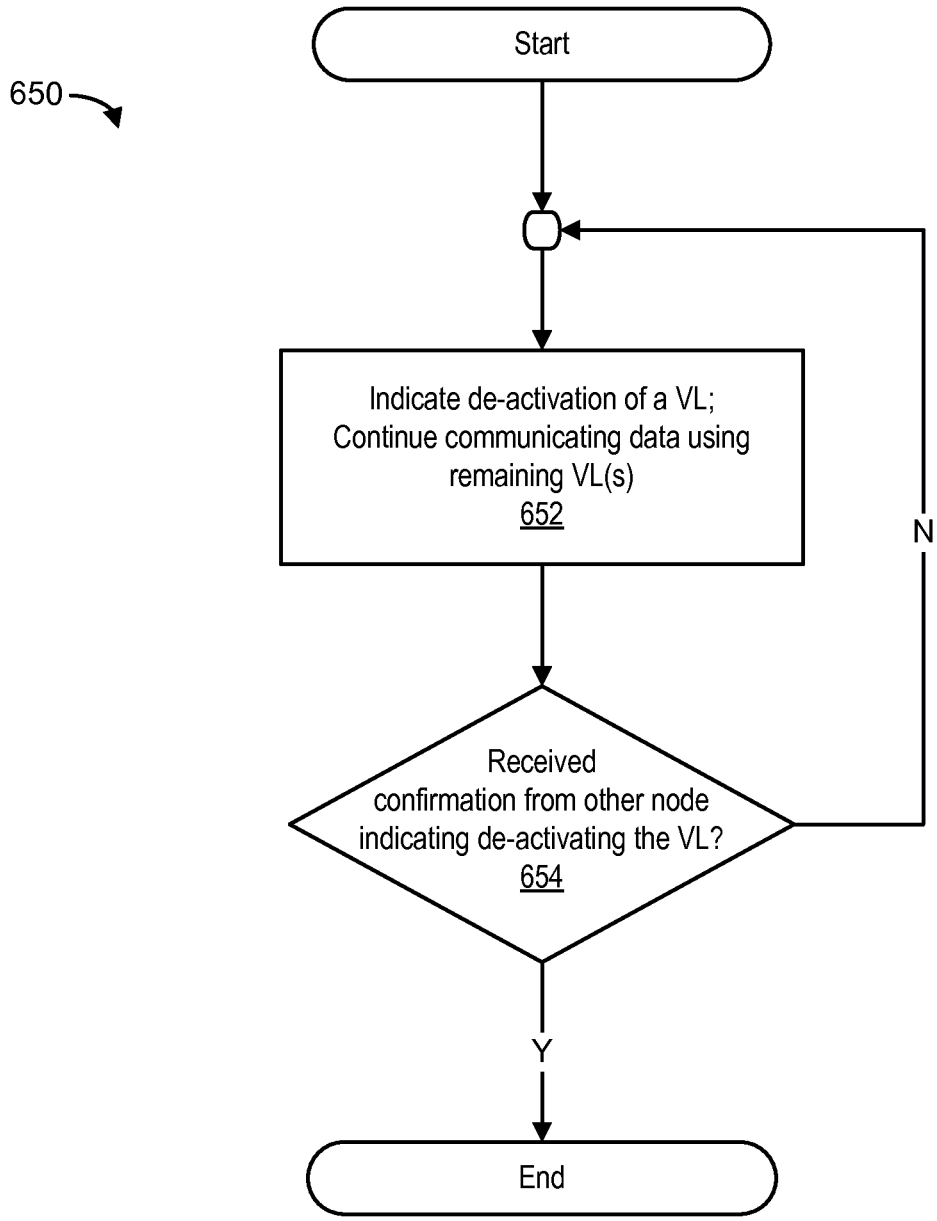
FIG. 6B is a flowchart illustrating a method for negotiation of deactivation of a virtual lane, according to some embodiments.

FIG. 6B illustrates a method 650 for negotiating deactivation of a virtual lane, according to some embodiments. Method 650 is described with reference to variations of the elements described in connection with FIG. 1. In one embodiment, at least portions of method 650 are executed by the nodes of FIG. 1, such as by control module 114(1). Method 650 can implement element 606 of method 600.

In element 652, the TR module (e.g., such as by being instructed by the control module of the transmitting node) sends an indication, to another node (i.e., the receiving node), regarding deactivation of a certain VL. In one embodiment, the TR module can send this indication using an AM of the VL that is being de-activated, or using AM(s) of other active VL(s). In another embodiment, the TR module can send this indication using the data blocks of the VL to be de-activated, or using the data blocks of other active VL(s). The control module continues to transmit the data to another node using the active VL(s), including the to-be deactivated VL.

In element 654, the control module detects whether a confirmation of deactivation of the virtual lane (VL) is received. For example, the TR module can receive a confirmation of a deactivation of VL 302(2). This confirmation can be received, for example, using any of AMs of VLs 302(1) and/or 302(3), such as where the confirmation message is included by these AMs. The TR module then communicates this request to the control module. If the control module detects the confirmation, method 650 ends (and then element 606 of method 6A is performed). Otherwise, if the control module does not detect such request, element 654 is performed. It is noted that the control module can also implement time-out/error recovery techniques (not shown) that would indicate that the negotiation is not successful.

In one embodiment, the control modules of the two nodes can implement an additional confirmation mechanism to further coordinate the timing of using the VLs. For example, once the appropriate VL is confirmed to be deactivated, the transmitting node can then use the AMs of the active VLs to indicate when it will start using the remaining VL to transmit data; and the receiving node will look for this indication in the active VL's AMs to determine when to expect using only the remaining VLs. For additional robustness, these indications can be implemented using several consecutive AMs, e.g., as a countdown to using the active VLs.

Figure 7:
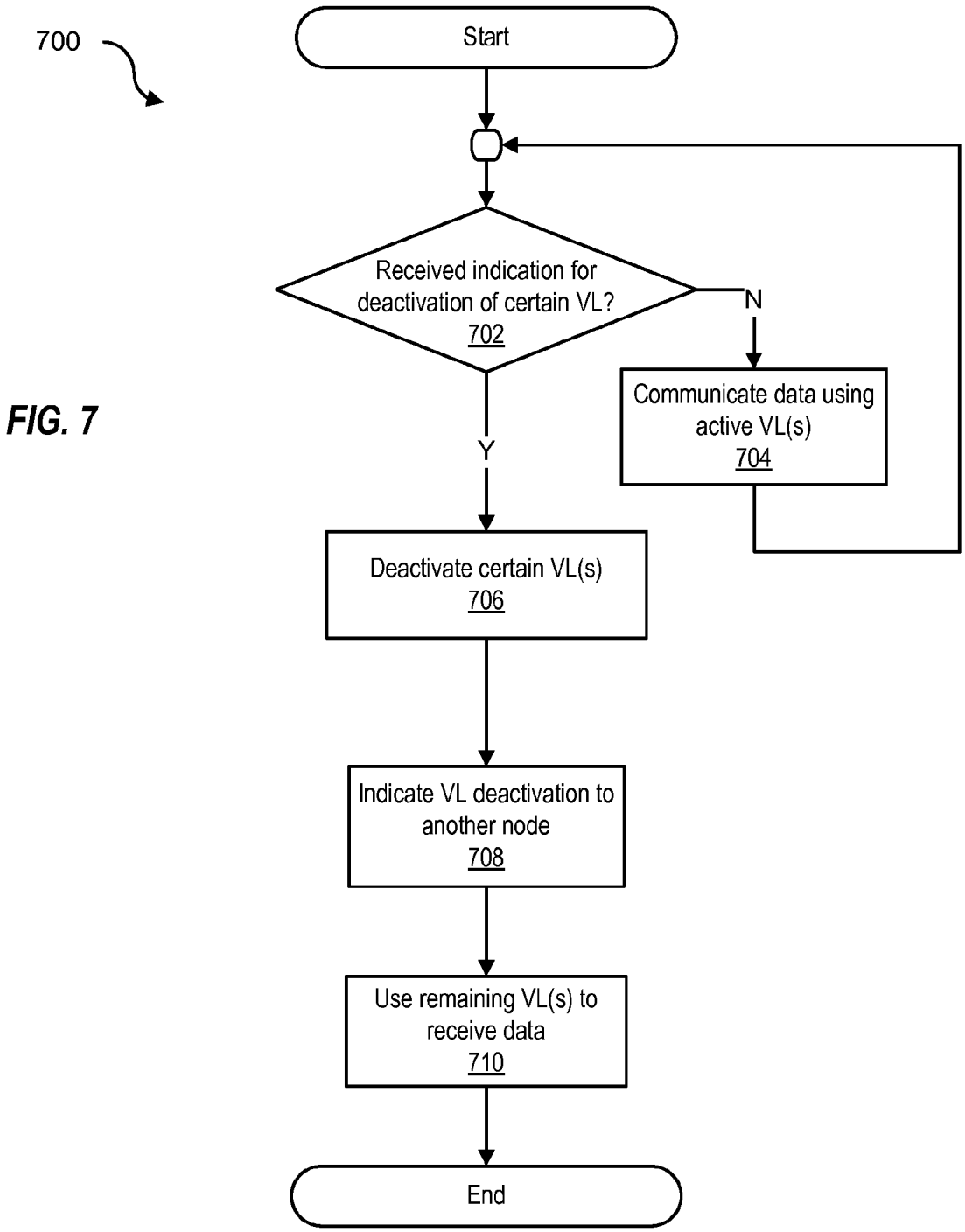
FIG. 7 is a flowchart illustrating a method for deactivation of a virtual lane, according to some embodiments.

FIG. 7 illustrates a method 700 for deactivating a virtual lane on the receiving node, according to some embodiments. Method 700 is described with reference to variations of the elements described in connection with FIG. 1. In one embodiment, at least portions of method 700 are executed by the nodes of FIG. 1, such as by control module 114(2) of node 102(2) that receives an indication of deactivation from node 102(1).

In element 702, a control module detects whether an indication is received from another module regarding deactivation of a certain VL. For example, the TR module can receive such an indication via a VL, e.g., from the other control module. As described above, such an indication can be received using the indicators, e.g., using alignment markers (AMs) of the VL to be de-activated and/or of the other active VL(s). In another embodiment, this negotiation can be performed using the data blocks of the VL to be deactivated, however, other implementations are contemplated. The TR module then communicates this indication to the control module. If the control module detects the indication, element 706 is performed. Otherwise, if the control module does not detect such request, element 702 is performed.

In element 704, the TR module receives data using the active VLs. For example, if there are three active VLs (VLs 302(1)-302(2)), the control module receives data using all three VLs, including a VL that is being negotiated to be de-activated.

In element 706, the control module (of the receiving node) deactivates one or more active VL(s) indicated by element 702 (such as by instructing the TR module). In one implementation, the control module will continue to process data sent using the deactivated VL(s) until the countdown process of element 710 is completed. In another embodiment, the control module doesn't process any data received using this deactivated VL once element 706 is performed.

In element 708, the control module of the receiving module indicates (e.g., by using the TR module) to the other node that the receiving module is ready to stop listening to the deactivated VL. The control module can indicate, for example, that the selected VL is deactivated using a confirmation that is sent using the alignment marker of one of the active VLs.

In element 710, the TR module (e.g., as instructed by the control module) receives data using the active VLs. For example, with reference to FIG. 3, after a successful negotiation, nodes communicate using VLs 302(1) and 303(3) only. In one embodiment (as described above with reference to element 654), the control modules of the two nodes can implement an additional confirmation mechanism to further coordinate the timing of using the VLs. For example, once the appropriate VL is confirmed to be deactivated, the receiving node can wait on indications from the transmitting node that would indicate when the transmitting node will start using the only the remaining VL(s) to transmit data. These indications can be sent by the transmitting node using several consecutive AMs (as the countdown described above).

Figure 8:
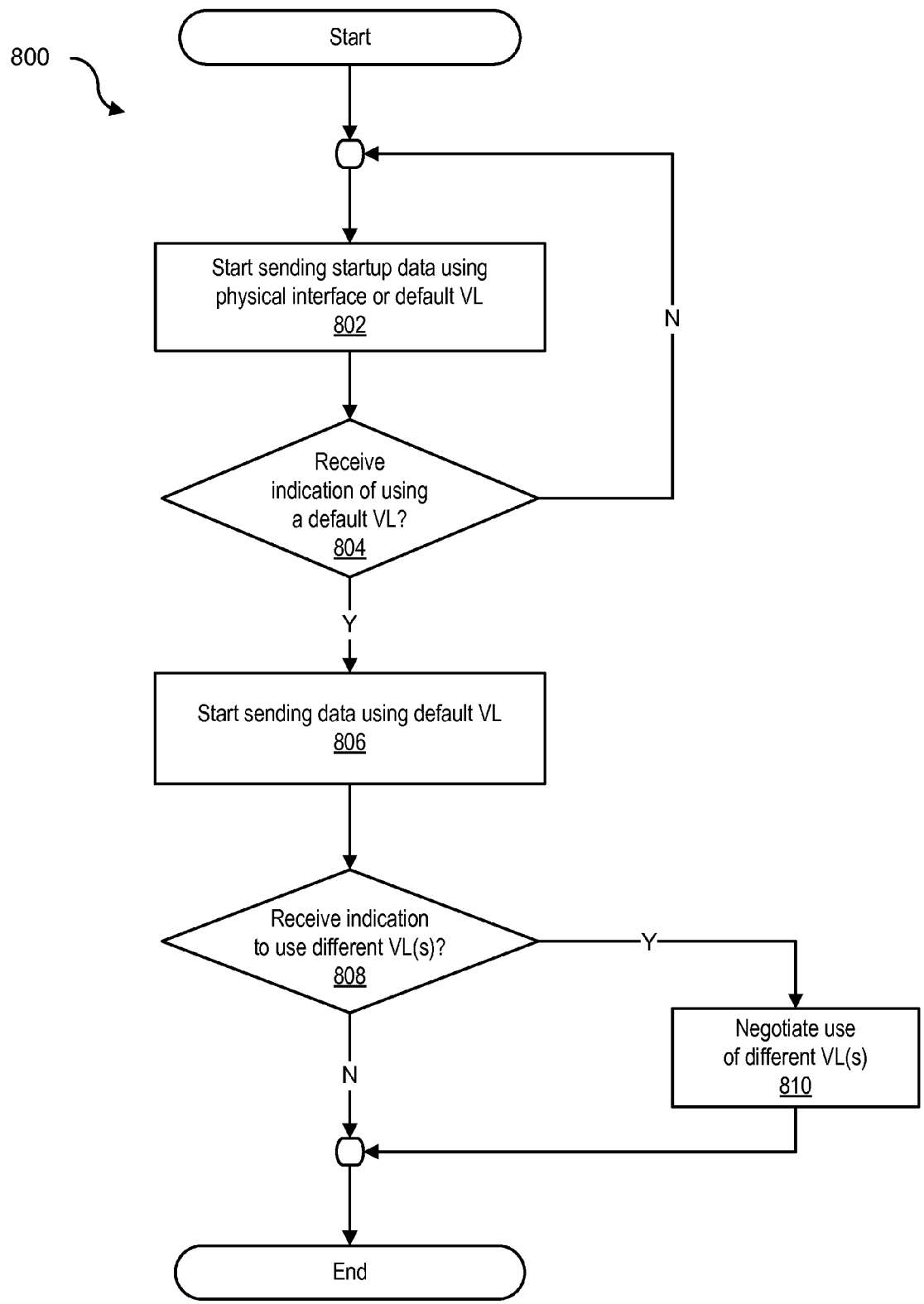
FIG. 8 is a flowchart illustrating a method for initialization of a communication interface for using virtual lane(s), according to some embodiments.
Figure 9:
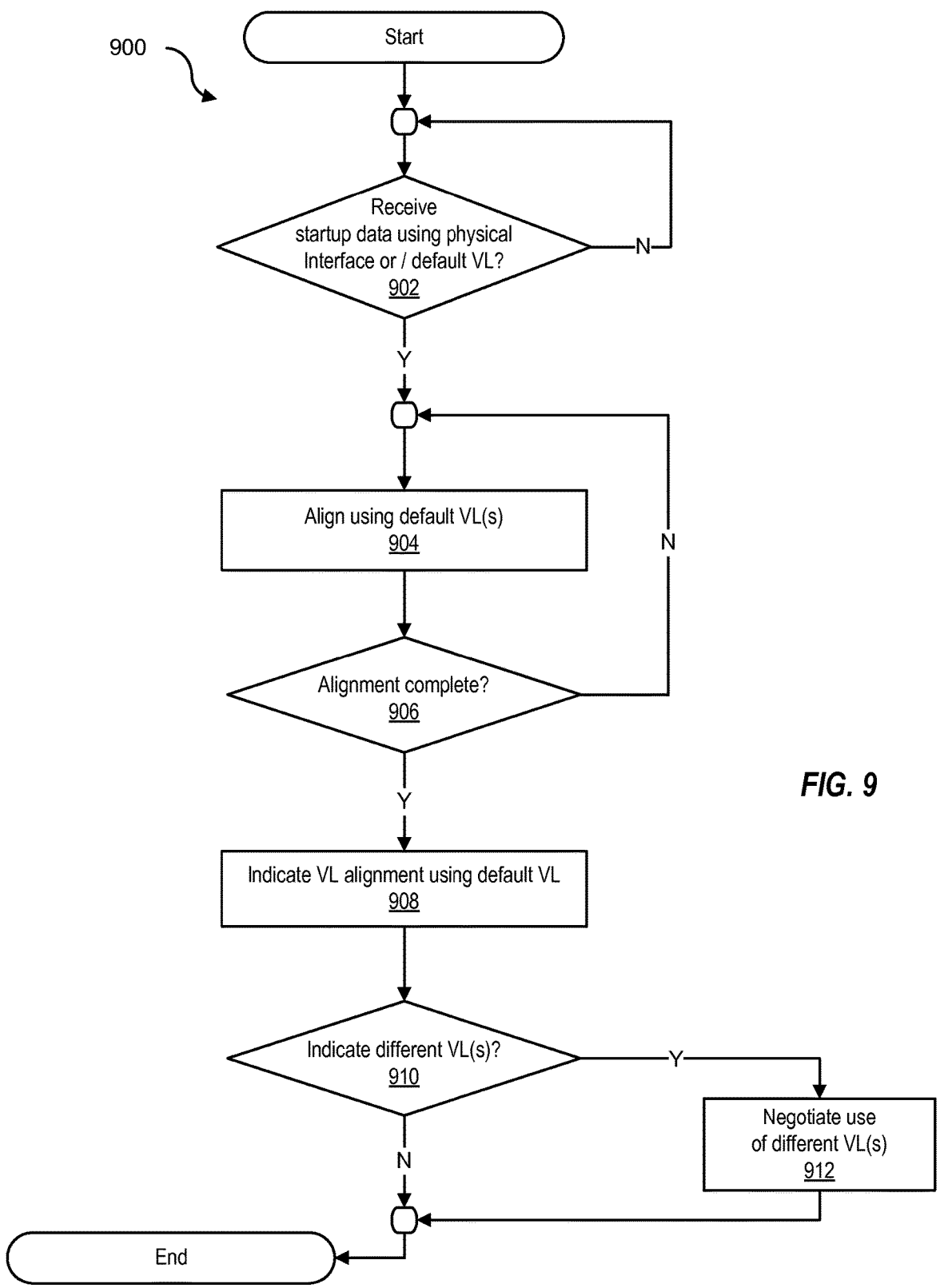
FIG. 9 is a flowchart illustrating a method for initialization of a communication interface for using virtual lane(s), according to some embodiments.

FIGS. 8 and 9 illustrate methods 800 and 900, respectively, for initializing a communication interface, such as at a start-up, according to some embodiments. Methods 800 and 900 are described with reference to variations of the elements described in connection with FIG. 1. In one embodiment, at least portions of method 800 are executed by a node of FIG. 1, such as by control module 114(1) of node 102(1), whereas at least portions of method 900 are executed by another node of FIG. 1, such as by control module 114(2) of node 102(2). It is noted that the methods of FIGS. 8 and 9 are typically executed by nodes at start-up. At start-up, typically the communication interface between the nodes is not yet set-up, so there are no VLs available for use (with a possible exception of a default VL, as described below). This situation can occur when node(s) are initially powered-on, or when a node is initially coupled to the network.

In element 802, a TR module (e.g., TR module 112(1) as instructed by control module 114(1) of node 102(1)) starts sending data to another node (node 102(2)). This can occur upon start-up of node 102(1), such as when the node is added to a network. The data can include start-up data, such as predetermined patterns or information indicating a start-up routine.

In one embodiment, upon start-up, there are no VLs that are configured between nodes 102(1) and 102(2). The data that is sent using physical connections of a physical interface does not indicate logical channel information (such as VL(s)), since no communication interface is configured at that time. In another embodiment, upon start-up, the TR module (of the node being added) sends data using a default VL. The default VL can be implemented as a VL that is active on a startup between two nodes. The TR module can be pre-configured to send data using such a default VL on every start-up. In either embodiment, the receiving module of the other node is configured to wait to receive (e.g., using the default VL) such start-up data from a node being added (as indicated by element 902).

In element 804, the control module (of the node being added) determines whether an indication is received from the other node. Thus, the receiving module of the node being added is configured to wait on the indications sent from the other node. The indication indicates that the other node received the (start-up) data (as sent in element 802). The TR module can receive such an indication via a default VL from a control module of the other node. Such an indication can be received using the indicators, e.g., using alignment markers (AMs) of the default VL. The TR module then communicates this indication to the control module. If the control module detects the indication, element 806 is performed. Otherwise, if the control module does not detect such request, element 802 is performed.

In element 806, the TR module (e.g., as instructed by the control module) starts to send data (such as startup data, or other data indicating VL configuration) using the default VL (e.g., such as VL 302(1) of FIG. 3). In element 808, the control module detects whether an indication is received from the other node indicating using a different VL (from the default VL). This indication can be received using the indicators (such as alignment markers (AMs)) of the default VL.

If the control module does not detect this indication, method 800 ends. In one embodiment, if another VL channel is not selected for data communication, the communication interface between the two nodes is initialized to use the default VL for communication between the two nodes. However, in another embodiment, if another VL channel is not selected for data communication, method 800 ends with the communication interface not set-up between the two nodes. In other words, in this embodiment, the default VL is not used for data communication other than for transmitting startup data, VL configuration, and related indications.

Otherwise, if the control module detects this indication, element 810 is performed. In element 810, use of a different VL is negotiated. This negotiated VL is then used for data communication between the two nodes. The VL negotiation can be performed using the data and/or indications, including AM indicators. Furthermore, during this negotiation, the VL pool can be setup between the two nodes. For example, in element 810, the two nodes can negotiate a pool of VLs that includes the active VL to be used for data communication as well as a number of inactive VLs (that can be later activated, such as described above with reference to FIGS. 4A-5).

As noted above, whereas at least portions of method 800 are executed by a node (e.g., node 102(1)) upon start-up. With regard to FIG. 9, at least portions of method 900 are executed by another node, such as by control module 114(2) of node 102(2).

In element 902, a control module (e.g., control module 114(2) of node 102(2)) determines whether data that indicates a start-up is received from another module (e.g., control module 114(1) of node 102(1)). Depending on the embodiment, the start-up data can be received over the physical interface or via a default VL. If the control module detects the start-up data, element 904 is performed. Otherwise, if the control module does not detect receiving start-up data, element 902 is performed.

In element 904, the control module aligns the default VL. This can include, for example, control module 114(2) communicating with its respective TR module (e.g., TR module 112(2)) to initialize using the default VL, start using AM indicators for the default VL, etc.

In element 906, the control module determines whether the alignment of the default VL is complete. This determination can include communicating with its respective TR module to determine whether the TR module has successfully completed alignment of the default VL. If the control module determines that the alignment is complete, element 908 is performed. Otherwise, if the control module determines that determines that the alignment is not complete, element 904 is performed.

In element 908, the control module (e.g., control module 114(2)) indicates (such as by using the TR module) to the other control module (e.g., control module 114(1)) that the alignment of the default VL is complete. This indication can be sent to the other control module using the indicators, e.g., using alignment markers (AMs) of the default VL.

In element 910, the control module determines whether to indicate that a different VL should be used instead of the default VL. This determination can be based on a run-time calculation, or it can be determined prior to execution of method 800, such as to free up the use of the default VL for other communication. If the control module determines that a different VL should be used, the control module executes element 912. Otherwise, if the control module does not make such determination, method 900 ends. In element 912, use of a different VL is negotiated, which includes sending indication(s) to use a different VL for data communication to the other node.

Figure 10:
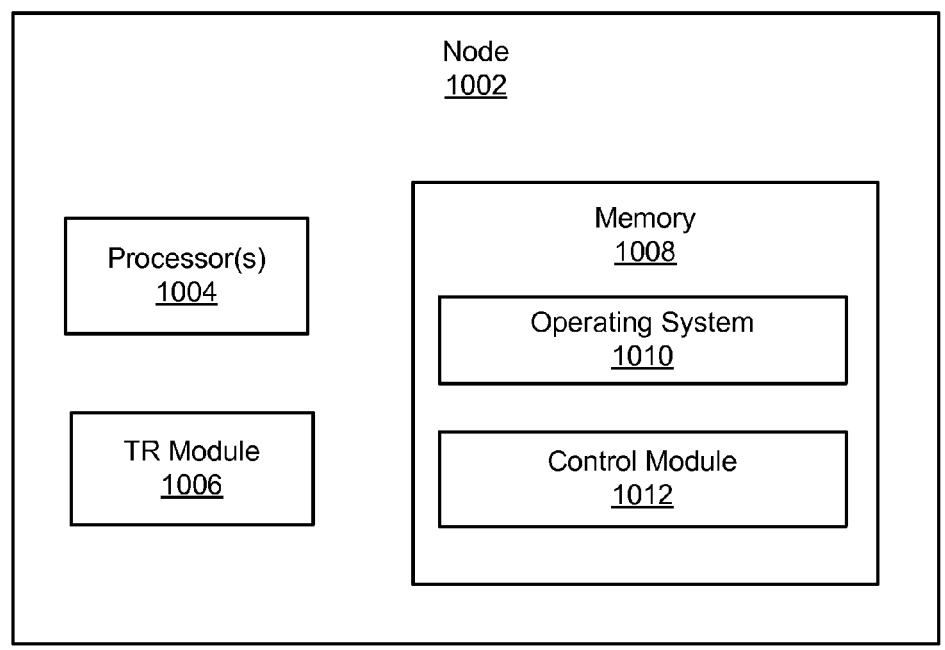
FIG. 10 is a block diagram illustrating an example node, according to one embodiment.

FIG. 10 is a block diagram 1000 illustrating an example node of a distributed storage system, according to one embodiment. Node 1002, which can implement nodes 102, includes a processor 1004, a TR module 1006, and a memory 1008. TR module 1006 can be an implementation of one or more of TR modules 112(1) and/or 112(2), as well as the TR module functionality shown by FIG. 2. Memory 1008 includes an operating system 1010 and control module 1012. It is noted that one or more of element(s) of control module 1012 can be implemented as software, hardware module(s), or some combination thereof. It is also noted that in some embodiments one or more of elements of node 1002 may not be used. Processor(s) 1004 executes one or more elements of control module 1012. Control module 1012 can be an implementation of control module 114(1) and/or 114(2) and/or control module 152, and can implement at least portions of methods 400-900.

Figure 11:
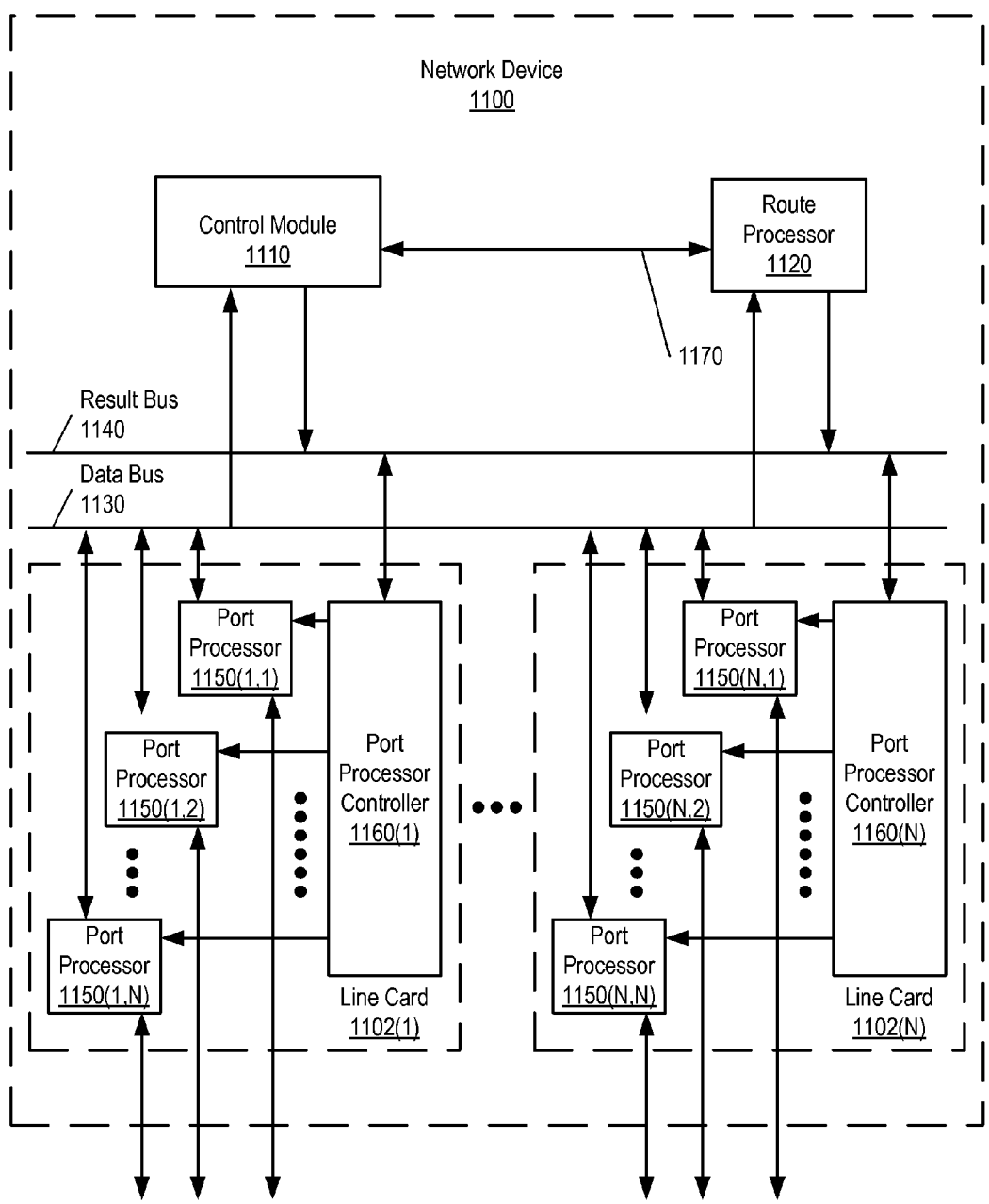
FIG. 11 is a block diagram illustrating relevant components of an example device in which the present disclosure can be implemented, according to one embodiment.

FIG. 11 is a block diagram illustrating relevant components of an example device 1100 (e.g., node 102(1), node 102(2), and/or node 1002). In this depiction, device 1100 includes a number of line cards (line cards 1102(1)-1102(N)) that are communicatively coupled to a control module 1110 (which can include a forwarding engine, not shown) and a route processor 1120 via a data bus 1130 and a result bus 1140. Line cards 1102(1)-(N) include a number of port processors 1150(1,1)-1150(N,N) which are controlled by port processor controllers 1160(1)-1160(N). It will also be noted that control module 1110 and route processor 1120 are not only coupled to one another via data bus 1130 and result bus 1140, but are also communicatively coupled to one another by a communications link 1170. It is noted that in alternative embodiments, each line card can include its own forwarding engine.

When a message (e.g., any of control messages (e.g., requests, notifications, confirmations, indications, etc.) that may be exchanged between nodes) is received, the message is identified and analyzed by a network device such as device 1100 in the following manner. Upon receipt, a message (or some or all of its control information) is sent from one of the port processors 1150(1,1)-1150(N,N) at which the message was received to one or more of those devices coupled to data bus 1130 (e.g., others of port processors 1150(1,1)-1150(N,N), a forwarding engine, and/or route processor 1120). Handling of the message can be determined, for example, by a forwarding engine. For example, a forwarding engine may determine that the message should be forwarded to one or more of port processors 1150(1,1)-1150(N,N). This can be accomplished by indicating to corresponding one(s) of port processor controllers 1160(1)-1160(N) that the copy of the message held in the given one(s) of port processors 1150(1,1)-1150(N,N) should be forwarded to the appropriate one of port processors 1150(1,1)-1150(N,N).

Device 1100 can implement the control modules and/or the TR modules (e.g., in control module 1110, or in one of port processor controllers 1160(1)-1160(N) and/or in route processor 1120) in order to facilitate the flexible rate network interface. Device 1100 can thus implement the method(s) illustrated in FIGS. 4A-9.

Figure 12:
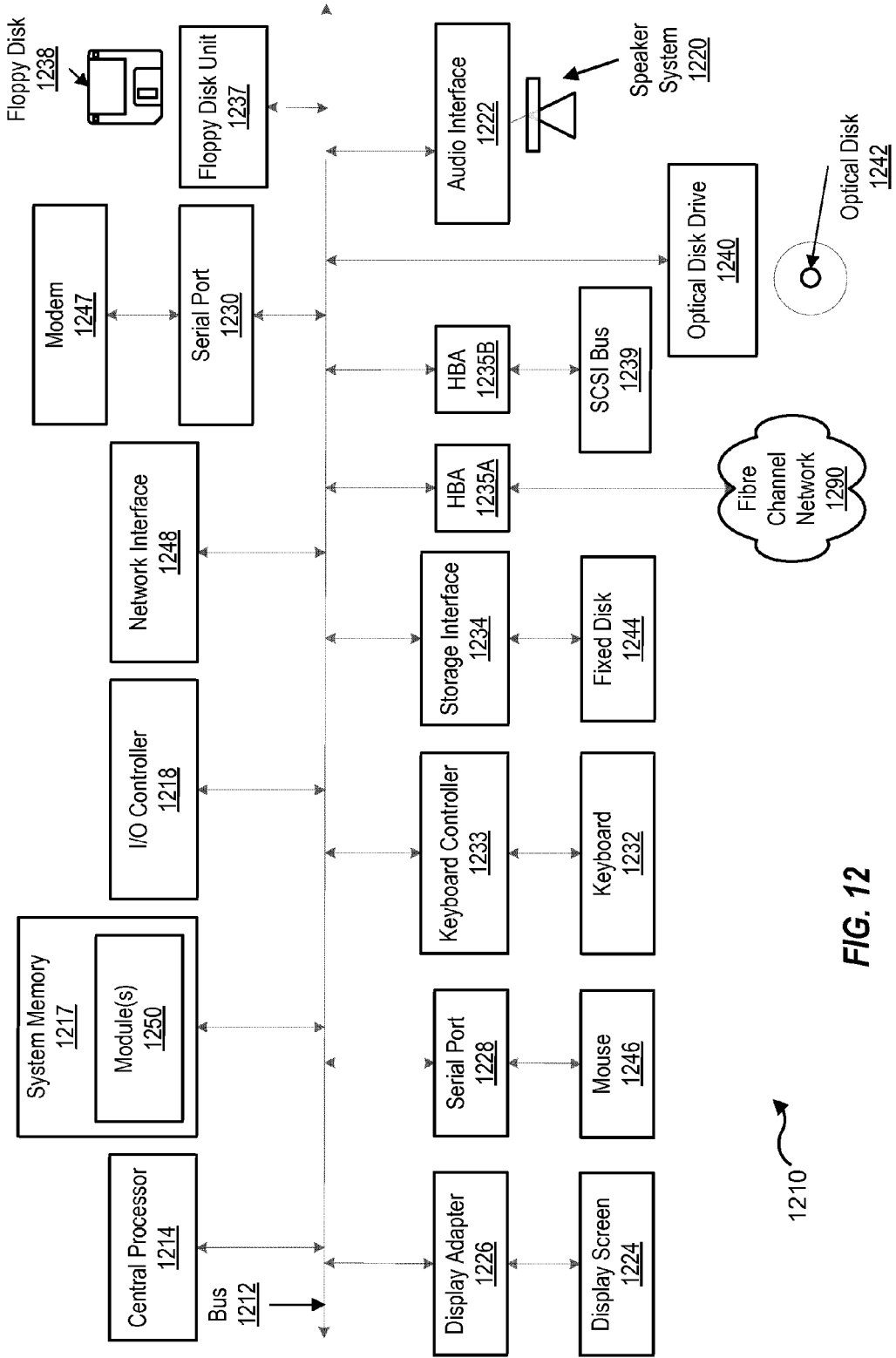
FIG. 12 is a block diagram that illustrates an example of a computer system suitable for implementing embodiments of the present application.

FIG. 12 depicts a block diagram of a computer system 1210 suitable for implementing the present disclosure. Computer system 1210 may be illustrative of various computer systems in the networked system of FIG. 1, such as node(s), among others. Computer system 1210 includes a bus 1212 which interconnects major subsystems of computer system 1210, such as a central processor 1214, a system memory 1217 (typically RAM, but which may also include ROM, flash RAM, or the like), an input/output controller 1218, an external audio device, such as a speaker system 1220 via an audio output interface 1222, an external device, such as a display screen 1224 via display adapter 1226, serial ports 1228 and 1230, a keyboard 1232 (interfaced with a keyboard controller 1233), a storage interface 1234, a floppy disk drive 1237 operative to receive a floppy disk 1238, a host bus adapter (HBA) interface card 1235A operative to connect with a Fibre Channel network 1290, a host bus adapter (HBA) interface card 1235B operative to connect to a SCSI bus 1239, and an optical disk drive 1240 operative to receive an optical disk 1242. Also included are a mouse 1246 (or other point-and-click device, coupled to bus 1212 via serial port 1228), a modem 1247 (coupled to bus 1212 via serial port 1230), and a network interface 1248 (coupled directly to bus 1212).

Bus 1212 allows data communication between central processor 1214 and system memory 1217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1210 are generally stored on and accessed via a computer readable medium, such as a hard disk drive (e.g., fixed disk 1244), an optical drive (e.g., optical drive 1240), a floppy disk unit 1237, or other storage medium. Additionally, applications can be in the form of electronic signals modulated in accordance with the application and data communication technology when accessed via network modem 1247 or interface 1248.

Storage interface 1234, as with the other storage interfaces of computer system 1210, can connect to a standard computer readable medium for storage and/or retrieval of information, such as a fixed disk drive 1244. Fixed disk drive 1244 may be a part of computer system 1210 or may be separate and accessed through other interface systems. Modem 1247 may provide a direct connection to a remote server via a telephone link or to the Internet via an internet service provider (ISP). Network interface 1248 may provide a direct connection to a remote server via a direct network link to the Internet via a POP (point of presence). Network interface 1248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 12 need not be present to practice the present disclosure. The devices and subsystems can be interconnected in different ways from that shown in FIG. 12. The operation of a computer system such as that shown in FIG. 12 is readily known in the art and is not discussed in detail in this application. Code for a network interface with adjustable rate (such as described above with reference to the methods of FIGS. 4A-9), etc., to implement the present disclosure can be stored in computer-readable storage media such as one or more of system memory 1217, fixed disk 1244, optical disk 1242, or floppy disk 1238. Memory 1220 is also used for storing temporary variables or other intermediate information during the execution of instructions by the processor 1210. The operating system provided on computer system 1210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although embodiments of the present disclosure have been described in connection with several embodiments, the embodiments are not intended to be limited to the specific forms set forth herein. On the contrary, the present disclosure is intended to cover such alternatives, modifications, and equivalents as can be reasonably included within the scope of the present disclosure as defined by the appended claims.

What is claimed is:

1. A method, comprising:
receiving a request to activate a virtual lane of an interface, wherein
the request is received by a first node,
the first node is configured to receive the request from a second node by virtue of the interface being configured to facilitate a data communication between the first node and the second node,
the interface is configured to support a plurality of virtual lanes, and
the plurality of virtual lanes comprise
at least one active virtual lane, and
at least one inactive virtual lane;
in response to receiving the request, causing the first node to negotiate with the second node, wherein
the causing the first node to negotiate comprises
negotiating a bandwidth to be used for the data communication by negotiating a number of virtual lanes,
the bandwidth is less than or equal to a physical bandwidth of the interface,
the negotiating operates to select an additional virtual lane from the at least one inactive virtual lane, and
the negotiating is performed to facilitate provision of the bandwidth by the interface;
in response to a successful negotiation, activating the additional virtual lane, wherein
after the activating, the first node is configured to communicate with the second node using the at least one active virtual lane and the additional virtual lane for the data communication; and
in response to an unsuccessful negotiation, continuing communication using only the at least one active virtual lane for the data communication.

2. The method of claim 1, wherein
the request is received via the at least one active virtual lane, and
the negotiating is performed using the at least one active virtual lane.

3. The method of claim 1, wherein
the first node is configured to transmit a respective marker in each of the at least one active virtual lane, each respective marker indicates alignment information for a portion of data transmitted by a respective active virtual lane, and
the negotiating comprises
using a marker of one of the at least one active virtual lane to transmit negotiating information, wherein the negotiating is based on the negotiating information.
4. The method of claim 1, wherein the negotiating comprises:
transmitting an alignment request to a second node, wherein
the alignment request requests alignment of the additional virtual lane.
5. The method of claim 4, wherein the negotiating further comprises:
determining whether an alignment response is received from the second node, wherein
the alignment response indicates alignment of the additional virtual lane by the second node, and
the activating the additional virtual lane is performed in response to a determination that the alignment response is received from the second node.
6. The method of claim 1, further comprising:
prior to the receiving the request,
determining a bandwidth for the at least one active virtual lane and a bandwidth for the at least one inactive virtual lane.
7. The method of claim 1, further comprising:
prior to the receiving the request,
determining whether to activate a virtual lane of the interface, and
in response to a determination to activate a virtual lane, generating the request to activate the virtual lane.
8. The method of claim 1, wherein
the interface is implemented using one or more physical lanes, and
the request is generated in response to a determination that the physical bandwidth has increased, wherein
the physical bandwidth represents a bandwidth of the one or more physical lanes.
9. The method of claim 1, wherein
the bandwidth characterizes a maximum amount of data that is configured to be communicated between the first node and the second node,
prior to the activating, the interface is characterized by a first bandwidth,
after the activating, the interface is characterized by a second bandwidth, and
the second bandwidth is larger than the first bandwidth.
10. The method of claim 1, wherein
the interface is further configured to transport a data stream between the first node and the second node,
prior to the activating, the data stream is transported by the at least one active virtual lane, and
after the activating, the data stream is transported by the at least one active virtual lane and the additional virtual lane.
11. The method of claim 1, further comprising:
receiving a deactivation request to deactivate one of virtual lanes of the interface, wherein
the deactivation request is received by the first node; and
in response to receiving the deactivation request, negotiating deactivation with the second node, wherein negotiation of the deactivation operates to select a first active virtual lane from one or more active virtual lanes of the interface, and
deactivating the first active virtual lane.
12. The method of claim 11, wherein
the interface is implemented using one or more physical lanes, and
the deactivation request is generated in response to a determination that a bandwidth of the one or more physical lanes has decreased.
13. The method of claim 1, wherein
the bandwidth is provided by a bandwidth of the at least one active virtual lane and a bandwidth of the additional virtual lane.
14. The method of claim 1, wherein selection of the additional virtual lane comprises:
selection of a media access control module from a plurality of media access control modules.
15. An apparatus comprising:
one or more processors;
a control module of a first node, executable by the one or more processors, wherein
the control module is configured to
detect whether a request to activate a virtual lane of an interface is received, wherein
the first node is configured to receive the request from a second node by virtue of the interface being configured to facilitate a data communication between the first node and the second node,
the interface is configured to support a plurality of virtual lanes, and
the plurality of virtual lanes comprise
at least one active virtual lane, and
at least one inactive virtual lane,
in response to a detection of the request,
cause the first node to negotiate with the second node, wherein
the control module is configured to
negotiate a bandwidth to be used for the data communication by negotiating a number of virtual lanes,
select an additional virtual lane from the at least one inactive virtual lane in order to facilitate provision of the number of virtual lanes by the interface, and
the bandwidth is less than or equal to a physical bandwidth of the interface,
in response to a successful negotiation, activate the additional virtual lane, wherein
the control module is configured to activate the additional virtual lane by performing an activation of the additional virtual lane, and
in response to an unsuccessful negotiation, continue communication using only the at least one active virtual lane for the data communication; and
a transmit and receive (TR) module of the first node, wherein
the TR module is configured to
in response to activation of the additional virtual lane, use the at least one active virtual lane and the additional virtual lane for the data communication, and
otherwise, use only the at least one active virtual lane for the data communication.

16. The apparatus of claim 15, wherein
the control module is configured to receive the request by the TR module using the at least one active virtual lane, and
the control module is configured to negotiate by virtue of the TR module being configured to use the at least active one virtual lane.

17. The apparatus of claim 15, wherein
the TR module is configured to transmit a respective marker in each of the at least one active virtual lane,
each respective marker indicates alignment information for a portion of data transmitted by a respective active virtual lane, and
the control module is configured to negotiate by virtue of being configured to
use a marker of one of the at least one active virtual lane to transmit negotiating information, wherein
the control module is configured to negotiate based on the negotiating information.

18. The apparatus of claim 15, wherein
the interface is implemented using one or more physical lanes, and
the request is generated in response to a determination that the physical bandwidth has increased, wherein
the physical bandwidth represents a bandwidth of the one or more physical lanes.

19. A computer program product comprising:
a plurality of instructions, comprising
a first set of instructions, executable on a computer system, configured to receive a request to activate a virtual lane of an interface, wherein the request is received by a first node,
the first node is configured to receive the request from a second node by virtue of the interface being configured to facilitate a data communication between the first node and the second node,
the interface is configured to support a plurality of virtual lanes, and
the plurality of virtual lanes comprise
at least one active virtual lane, and
at least one inactive virtual lane,
a second set of instructions, executable on the computer system, configured to, in response to receiving the request, cause the first node to negotiate with the second node, wherein
the second set of instructions comprises
a first subset of instructions, executable on the computer system, configured to negotiate a bandwidth to be used for the data communication by negotiating a number of virtual lanes,
the bandwidth is less than or equal to a physical bandwidth of the interface,
the second set of instructions operates to select an additional virtual lane from the at least one inactive virtual lane,
the second set of instructions are configured to facilitate provision of the bandwidth by the interface, and
a third set of instructions, executable on the computer system, configured to,
in response to a successful negotiation, activate the additional virtual lane, wherein
the third set of instructions is configured to activate the additional virtual lane by performing an activation of the additional virtual lane, and
after the activation, the first node is configured to communicate with the second node using the at least one active virtual lane and the additional virtual lane for the data communication, and
in response to an unsuccessful negotiation, continue communication using only the at least one active virtual lane for the data communication; and
a non-transitory computer-readable storage medium, wherein the instructions are encoded in the non-transitory computer-readable storage medium.

20. The computer program product of claim 19, wherein
the request is received via the at least one active virtual lane, and
the second set of instructions use the at least one active virtual lane.

21. The computer program product of claim 19, wherein
the first node is configured to transmit a respective marker in each of the at least one active virtual lane,
each respective marker indicates alignment information for a portion of data transmitted by a respective active virtual lane, and
the second set of instructions use a marker of one of the at least one active virtual lane to transmit negotiating information, wherein
the second set of instructions are configured to negotiate based on the negotiating information.

22. The computer program product of claim 19, wherein
the interface is implemented using one or more physical lanes, and
the request is generated in response to a determination that the physical bandwidth has increased, wherein
the physical bandwidth represents a bandwidth of the one or more physical lanes.

* * * * *